US012777474B2

(12) United States Patent
Maamari et al.

(10) Patent No.: US 12,777,474 B2
(45) Date of Patent: Oct. 27, 2026

(54) SIGNALING AND SELECTION OF COMMUNICATION PARAMETERS IN A WIRELESS COMMUNICATIONS SYSTEM

(71) Applicant: QUALCOMM Incorporated, San Diego, CA (US)

(72) Inventors: Diana Maamari, San Diego, CA (US); Jing Jiang, San Diego, CA (US); Gabi Sarkis, San Diego, CA (US); Jae Won Yoo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 256 days.

(21) Appl. No.: 18/785,393

(22) Filed: Jul. 26, 2024

(65) Prior Publication Data

US 2026/0032667 A1 Jan. 29, 2026

(51) Int. Cl.
*H04W 72/12* (2023.01)
*H04W 72/54* (2023.01)

(52) U.S. Cl.
CPC ........... *H04W 72/12* (2013.01); *H04W 72/54* (2023.01)

(58) Field of Classification Search
None
See application file for complete search history.

(56) References Cited

U.S. PATENT DOCUMENTS

| | | | | |
|---|---|---|---|---|
| 7,181,620 | B1 * | 2/2007 | Hur | H04L 63/0869 713/168 |
| 10,014,986 | B2 * | 7/2018 | Berggren | H04W 72/23 |
| 2004/0104097 | A1 * | 6/2004 | Ngee | H04L 63/0414 194/210 |
| 2005/0102512 | A1 * | 5/2005 | Goh | H04L 9/3073 713/168 |
| 2019/0268920 | A1 * | 8/2019 | Falahati | H04W 72/0446 |
| 2023/0029963 | A1 * | 2/2023 | Yuan | H04L 1/1614 |
| 2026/0081735 | A1 * | 3/2026 | Sun | H04L 1/1854 |

* cited by examiner

*Primary Examiner* — Shukri Taha
(74) *Attorney, Agent, or Firm* — Holland & Hart LLP

(57) ABSTRACT

Methods, systems, and devices for wireless communication are described. A user equipment (UE) may indicate a first quantity of communication resources associated with a first processing time in which the UE is capable of processing a message that is transmitted over a set of transmission layers using the first quantity of communication resources. The UE may indicate a second quantity of communication resources associated with a second processing time in which the UE is capable of processing a downlink message that is transmitted over the set of transmission layers using the second quantity of communication resources. The UE may receive control signaling, for a scheduled downlink message, that indicates the second quantity of communication resources and that schedules the UE in accordance with the second processing time.

20 Claims, 14 Drawing Sheets

200

210

| Index | Processing Time | # of Layers | # of RBs | Scheduling Condition(s) |
|---|---|---|---|---|
| 0 | B1 | N | M | None |
| 1 | B1 + Offset1 | N | M + Delta1 | Slots off = X1<br>Feedback latency = L_Fdbk + T1 |
| 2 | B1 + Offset2 | N+1 | M | Slots off = X2<br>Feedback latency = L_Fdbk + T2 |

200

SIGNALING AND SELECTION OF COMMUNICATION PARAMETERS IN A WIRELESS COMMUNICATIONS SYSTEM

FIELD OF TECHNOLOGY

The following relates to wireless communication, including signaling and selection of communication parameters in a wireless communications system.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

Techniques for improving the throughput between a UE and a base station may be desired.

SUMMARY

The systems, methods, and devices of this disclosure each have several innovative aspects, no single one of which is solely responsible for the desirable attributes disclosed herein. A user equipment (UE) may transmit to a network entity an indication of various processing times supported by the UE and corresponding communication parameters for the processing times. The network entity may select one of the processing times and corresponding communication parameters for communication with the UE.

A method for wireless communications by a UE is described. The method may include transmitting a first indication of a first quantity of communication resources associated with a first processing time in which the UE is capable of processing a message that is transmitted over a set of transmission layers using the first quantity of communication resources, transmitting a second indication of a second quantity of communication resources associated with a second processing time in which the UE is capable of processing a message that is transmitted over the set of transmission layers using the second quantity of communication resources, where the second quantity of communication resources is greater than the first quantity of communication resources, and the second processing time is greater than the first processing time, and receiving control signaling, for a scheduled message and based on the first indication and the second indication, that indicates one of the first quantity of communication resources or the second quantity of communication resources and that schedules the UE in accordance with one of the first processing time or the second processing time.

A UE for wireless communications is described. The UE may include one or more memories storing processor executable code, and one or more processors coupled with the one or more memories. The one or more processors may individually or collectively be operable to execute the code to cause the UE to transmit a first indication of a first quantity of communication resources associated with a first processing time in which the UE is capable of processing a message that is transmitted over a set of transmission layers using the first quantity of communication resources, transmit a second indication of a second quantity of communication resources associated with a second processing time in which the UE is capable of processing a message that is transmitted over the set of transmission layers using the second quantity of communication resources, where the second quantity of communication resources is greater than the first quantity of communication resources, and the second processing time is greater than the first processing time, and receive control signaling, for a scheduled message and based on the first indication and the second indication, that indicates one of the first quantity of communication resources or the second quantity of communication resources and that schedules the UE in accordance with one of the first processing time or the second processing time.

Another UE for wireless communications is described. The UE may include means for transmitting a first indication of a first quantity of communication resources associated with a first processing time in which the UE is capable of processing a message that is transmitted over a set of transmission layers using the first quantity of communication resources, means for transmitting a second indication of a second quantity of communication resources associated with a second processing time in which the UE is capable of processing a message that is transmitted over the set of transmission layers using the second quantity of communication resources, where the second quantity of communication resources is greater than the first quantity of communication resources, and the second processing time is greater than the first processing time, and means for receiving control signaling, for a scheduled message and based on the first indication and the second indication, that indicates one of the first quantity of communication resources or the second quantity of communication resources and that schedules the UE in accordance with one of the first processing time or the second processing time.

A non-transitory computer-readable medium storing code for wireless communications is described. The code may include instructions executable by one or more processors to transmit a first indication of a first quantity of communication resources associated with a first processing time in which the UE is capable of processing a message that is transmitted over a set of transmission layers using the first quantity of communication resources, transmit a second indication of a second quantity of communication resources associated with a second processing time in which the UE is capable of processing a message that is transmitted over the set of transmission layers using the second quantity of communication resources, where the second quantity of communication resources is greater than the first quantity of communication resources, and the second processing time is greater than the first processing time, and receive control signaling, for a scheduled message and based on the first indication and the second indication, that indicates one of the first quantity of communication resources or the second quantity of communication resources and that schedules the UE in accordance with one of the first processing time or the second processing time.

In some examples of the method, UEs, and non-transitory computer-readable medium described herein, the second processing time is associated with discontinuous scheduling of the UE in which the UE is scheduled with temporal gaps between communications.

In some examples of the method, UEs, and non-transitory computer-readable medium described herein, the first processing time may be associated with a first latency for providing feedback and the method, apparatuses, and non-transitory computer-readable medium may include further operations, features, means, or instructions for receiving the scheduled message based on the control signaling and transmitting a feedback message for the scheduled message according to a second latency that may be longer than the first latency.

In some examples of the method, UEs, and non-transitory computer-readable medium described herein, the control signaling indicates the second latency.

In some examples of the method, UEs, and non-transitory computer-readable medium described herein, the control signaling indicates the second quantity of communication resources and schedules the UE in accordance with the second processing time, the control signaling schedules the UE with a gap in communications relative to receipt of the scheduled message, and a duration of the gap may be based on the second processing time.

In some examples of the method, UEs, and non-transitory computer-readable medium described herein, the second processing time may be based on the second quantity of communication resources, the set of transmission layers, and a baseline processing time for the UE to process physical downlink shared channel (PDSCH) messages.

Some examples of the method, UEs, and non-transitory computer-readable medium described herein may further include operations, features, means, or instructions for processing a second scheduled message according to the first processing time based on expiration of a timer associated with the second processing time.

Some examples of the method, UEs, and non-transitory computer-readable medium described herein may further include operations, features, means, or instructions for processing a second scheduled message according to the first processing time based on receiving an indication to process the second scheduled message according to the first processing time.

Some examples of the method, UEs, and non-transitory computer-readable medium described herein may further include operations, features, means, or instructions for processing a second scheduled message according to the first processing time based on receiving an indication of a time division duplexing (TDD) duty cycle associated with the first processing time.

In some examples of the method, UEs, and non-transitory computer-readable medium described herein, the second indication also indicates the second processing time associated with the second quantity of communication resources.

In some examples of the method, UEs, and non-transitory computer-readable medium described herein, the second processing time may be indicated as a duration of time, as a TDD duty cycle value or pattern, or as a quantity of slots.

In some examples of the method, UEs, and non-transitory computer-readable medium described herein, the first quantity of communication resources and the second quantity of communication resources both include resource blocks.

In some examples of the method, UEs, and non-transitory computer-readable medium described herein, the first quantity of communication resources and the second quantity of communication resources both include component carriers.

In some examples of the method, UEs, and non-transitory computer-readable medium described herein, the second processing time may be associated with a reduced throughput relative to a peak throughput for the UE, a relaxed feedback timeline relative to a baseline feedback timeline for the UE, or both.

A method for wireless communications by a network entity is described. The method may include receiving a first indication of a first quantity of communication resources associated with a first processing time in which a UE is capable of processing a message that is transmitted over a set of transmission layers using the first quantity of communication resources, receiving a second indication of a second quantity of communication resources associated with a second processing time in which the UE is capable of processing a message that is transmitted over the set of transmission layers using the second quantity of communication resources, where the second quantity of communication resources is greater than the first quantity of communication resources, and the second processing time is greater than the first processing time, and transmitting control signaling, for a scheduled message and based on the first indication and the second indication, that indicates one of the first quantity of communication resources or the second quantity of communication resources and that schedules the UE in accordance with one of the first processing time or the second processing time.

A network entity for wireless communications is described. The network entity may include one or more memories storing processor executable code, and one or more processors coupled with the one or more memories. The one or more processors may individually or collectively be operable to execute the code to cause the network entity to receive a first indication of a first quantity of communication resources associated with a first processing time in which a UE is capable of processing a message that is transmitted over a set of transmission layers using the first quantity of communication resources, receive a second indication of a second quantity of communication resources associated with a second processing time in which the UE is capable of processing a message that is transmitted over the set of transmission layers using the second quantity of communication resources, where the second quantity of communication resources is greater than the first quantity of communication resources, and the second processing time is greater than the first processing time, and transmit control signaling, for a scheduled message and based on the first indication and the second indication, that indicates one of the first quantity of communication resources or the second quantity of communication resources and that schedules the UE in accordance with one of the first processing time or the second processing time.

Another network entity for wireless communications is described. The network entity may include means for receiving a first indication of a first quantity of communication resources associated with a first processing time in which a UE is capable of processing a message that is transmitted over a set of transmission layers using the first quantity of communication resources, means for receiving a second indication of a second quantity of communication resources associated with a second processing time in which the UE is capable of processing a message that is transmitted over the set of transmission layers using the second quantity of communication resources, where the second quantity of communication resources is greater than the first quantity of communication resources, and the second processing time is greater than the first processing time, and means for transmitting control signaling, for a scheduled message and based on the first indication and the second indication, that indicates one of the first quantity of communication resources or the second quantity of communication resources and that schedules the UE in accordance with one of the first processing time or the second processing time.

A non-transitory computer-readable medium storing code for wireless communications is described. The code may include instructions executable by one or more processors to receive a first indication of a first quantity of communication resources associated with a first processing time in which a UE is capable of processing a message that is transmitted over a set of transmission layers using the first quantity of communication resources, receive a second indication of a second quantity of communication resources associated with a second processing time in which the UE is capable of processing a message that is transmitted over the set of transmission layers using the second quantity of communication resources, where the second quantity of communication resources is greater than the first quantity of communication resources, and the second processing time is greater than the first processing time, and transmit control signaling, for a scheduled message and based on the first indication and the second indication, that indicates one of the first quantity of communication resources or the second quantity of communication resources and that schedules the UE in accordance with one of the first processing time or the second processing time.

In some examples of the method, network entities, and non-transitory computer-readable medium described herein, the first processing time may be associated with a first latency for providing feedback and the method, apparatuses, and non-transitory computer-readable medium may include further operations, features, means, or instructions for transmitting the scheduled message based on the control signaling and receiving a feedback message for the scheduled message according to a second latency that may be longer than the first latency.

In some examples of the method, network entities, and non-transitory computer-readable medium described herein, the control signaling indicates the second latency.

In some examples of the method, network entities, and non-transitory computer-readable medium described herein, the control signaling indicates the second quantity of communication resources and schedules the UE in accordance with the second processing time, the control signaling schedules the UE with a gap in communications relative to receipt of the scheduled message, and a duration of the gap may be based on the second processing time.

In some examples of the method, network entities, and non-transitory computer-readable medium described herein, the second processing time may be based on the second quantity of communication resources, the set of transmission layers, and a baseline processing time for the UE to process PDSCH messages.

Some examples of the method, network entities, and non-transitory computer-readable medium described herein may further include operations, features, means, or instructions for transmitting an indication for the UE to process a second scheduled message according to the first processing time.

Some examples of the method, network entities, and non-transitory computer-readable medium described herein may further include operations, features, means, or instructions for transmitting an indication of a TDD duty cycle associated with the first processing time.

In some examples of the method, network entities, and non-transitory computer-readable medium described herein, the second indication also indicates the second processing time associated with the second quantity of communication resources.

In some examples of the method, network entities, and non-transitory computer-readable medium described herein, the second processing time may be indicated as a duration of time, as a TDD duty cycle value or pattern, or as a quantity of slots.

In some examples of the method, network entities, and non-transitory computer-readable medium described herein, the first quantity of communication resources and the second quantity of communication resources both include resource blocks.

In some examples of the method, network entities, and non-transitory computer-readable medium described herein, the first quantity of communication resources and the second quantity of communication resources both include component carriers.

In some examples of the method, network entities, and non-transitory computer-readable medium described herein, the second processing time may be associated with a reduced throughput relative to a peak throughput for the UE, a relaxed feedback timeline relative to a baseline feedback timeline for the UE, or both.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

DETAILED DESCRIPTION

A user equipment (UE) may have a baseline processing time for processing messages (e.g., uplink messages, downlink messages). For downlink messages, the UE may also have a baseline feedback timeline for providing feedback. The wireless communications system in which the UE operates may support a peak (e.g., maximum) throughput that is based on (e.g., a function of) communication parameters such as a maximum quantity of communication resources and a maximum quantity of transmission layers permitted for a message. However, the actual communication parameters used for a message may be limited by the UE's baseline processing time and/or baseline feedback time, which may reduce the throughput and efficiency of the wireless communications system.

According to the techniques described herein, the efficiency of a wireless communications system may be increased by scheduling a UE with a relaxed timeline so that the UE can process a message with communication parameters that provide a higher throughput than would otherwise be supported by the UE. For example, the UE may be scheduled with a longer processing time (relative to the UE's baseline processing time) for a message, a longer feedback timeline (relative to the UE's baseline feedback timeline) for a message, or both, so that a higher quantity of communication resources, transmission layers, or both, can be used for the message. In such a scenario, the cost in latency (from relaxing the timeline) may be outweighed by the increase(s) in the communication parameters, resulting in an overall net gain in throughput relative to the baseline case.

Aspects of the disclosure are initially described in the context of wireless communications systems. Additional aspects of the disclosure are described with reference to communication resources and a process flow. Aspects of the disclosure are further illustrated by and described with reference to apparatus diagrams, system diagrams, and flowcharts that relate to signaling and selection of communication parameters in a wireless communications system.

Figure 1:
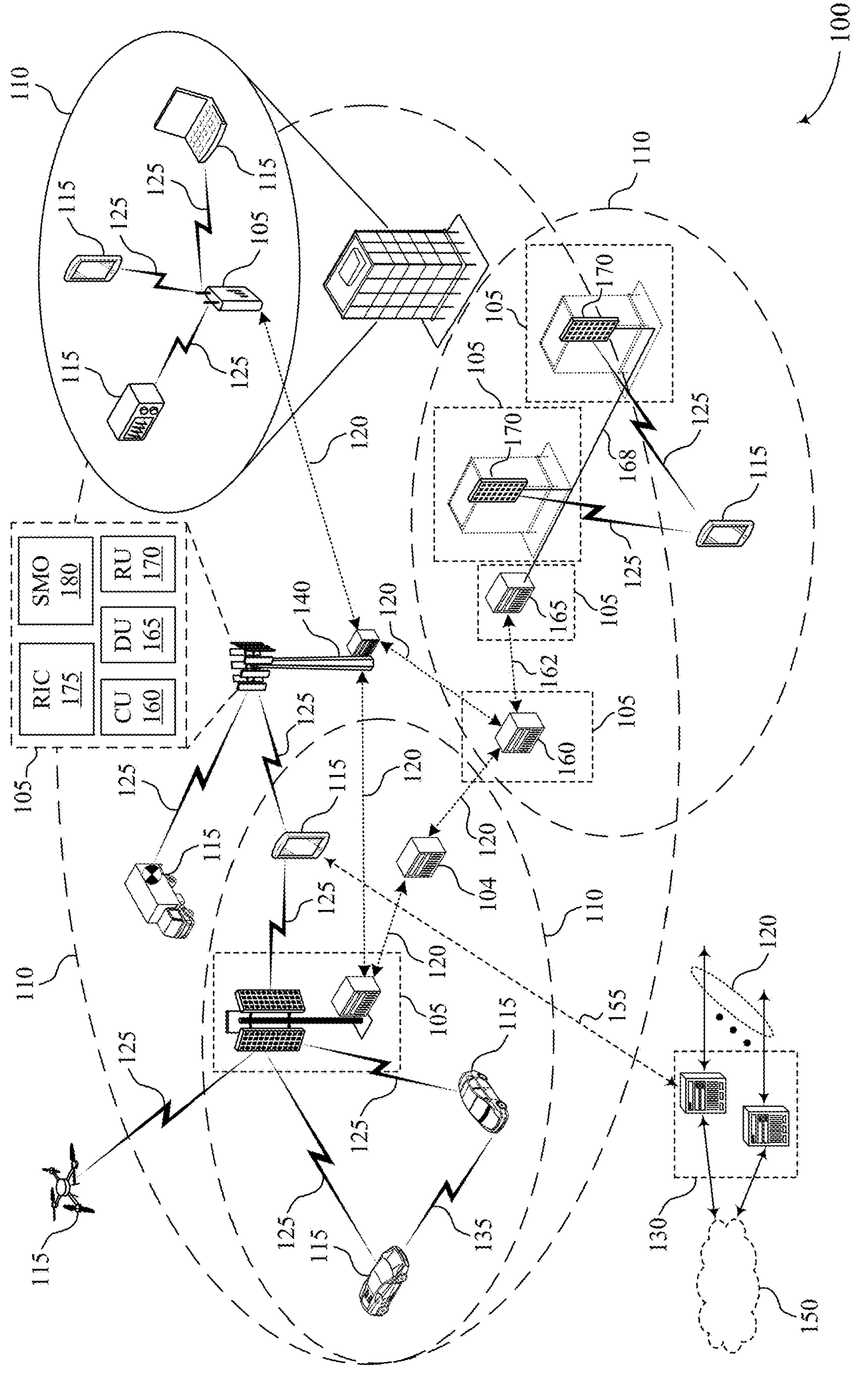
FIG. 1 shows an example of a wireless communications system that supports signaling and selection of communication parameters in accordance with one or more aspects of the present disclosure.

FIG. 1 shows an example of a wireless communications system 100 that supports signaling and selection of communication parameters in a wireless communications system in accordance with one or more aspects of the present disclosure. The wireless communications system 100 may include one or more devices, such as one or more network devices (e.g., network entities 105), one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via communication link(s) 125 (e.g., a radio frequency (RF) access link). For example, a network entity 105 may support a coverage area 110 (e.g., a geographic coverage area) over which the UEs 115 and the network entity 105 may establish the communication link(s) 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices in the wireless communications system 100 (e.g., other wireless communication devices, including UEs 115 or network entities 105), as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with a core network 130, or with one another, or both. For example, network entities 105 may communicate with the core network 130 via backhaul communication link(s) 120 (e.g., in accordance with an S1, N2, N3, or other interface protocol). In some examples, network entities 105 may communicate with one another via backhaul communication link(s) 120 (e.g., in accordance with an X2, Xn, or other interface protocol) either directly (e.g., directly between network entities 105) or indirectly (e.g., via the core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication link(s) 120, midhaul communication links 162, or fronthaul communication links 168 may be or include one or more wired links (e.g., an electrical link, an optical fiber link) or one or more wireless links (e.g., a radio link, a wireless optical link), among other examples or various combinations thereof. A UE 115 may communicate with the core network 130 via a communication link 155.

One or more of the network entities 105 or network equipment described herein may include or may be referred to as a base station 140 (e.g., a base transceiver station, a radio base station, an NR base station, an access point, a radio transceiver, a NodeB, an eNodeB (eNB), a next-generation NodeB or giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within one network entity (e.g., a network entity 105 or a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among multiple network entities (e.g., network entities 105), such as an integrated access and backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU), such as a CU 160, a distributed unit (DU), such as a DU 165, a radio unit (RU), such as an RU 170, a RAN Intelligent Controller (RIC), such as an RIC 175 (e.g., a Near-Real Time RIC (Near-RT RIC), a Non-Real Time RIC (Non-RT RIC)), a Service Management and Orchestration (SMO) system, such as an SMO system 180, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more of the network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, or any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaptation protocol (SDAP), Packet Data Convergence Protocol (PDCP)). The CU 160 (e.g., one or more CUs) may be connected to a DU 165 (e.g., one or more DUs) or an RU 170 (e.g., one or more RUs), or some combination thereof, and the DUs 165, RUs 170, or both may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or multiple different RUs, such as an RU 170). In some cases, a functional split between a CU 160 and a DU 165 or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to a DU 165 via a midhaul communication link 162 (e.g., F1, F1-c, F1-u), and a DU 165 may be connected to an RU 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities (e.g., one or more of the network entities 105) that are in communication via such communication links.

In some wireless communications systems (e.g., the wireless communications system 100), infrastructure and spectral resources for radio access may support wireless backhaul link capabilities to supplement wired backhaul connections, providing an IAB network architecture (e.g., to a core network 130). In some cases, in an IAB network, one or more of the network entities 105 (e.g., network entities 105 or IAB node(s) 104) may be partially controlled by each other. The IAB node(s) 104 may be referred to as a donor entity or an IAB donor. A DU 165 or an RU 170 may be partially controlled by a CU 160 associated with a network entity 105 or base station 140 (such as a donor network entity or a donor base station). The one or more donor entities (e.g., IAB donors) may be in communication with one or more additional devices (e.g., IAB node(s) 104) via supported access and backhaul links (e.g., backhaul communication link(s) 120). IAB node(s) 104 may include an IAB mobile termination (IAB-MT) controlled (e.g., scheduled) by one or more DUs (e.g., DUs 165) of a coupled IAB donor. An IAB-MT may be equipped with an independent set of antennas for relay of communications with UEs 115 or may share the same antennas (e.g., of an RU 170) of IAB node(s) 104 used for access via the DU 165 of the IAB node(s) 104 (e.g., referred to as virtual IAB-MT (vIAB-MT)). In some examples, the IAB node(s) 104 may include one or more DUs (e.g., DUs 165) that support communication links with additional entities (e.g., IAB node(s) 104, UEs 115) within the relay chain or configuration of the access network (e.g., downstream). In such cases, one or more components of the disaggregated RAN architecture (e.g., the IAB node(s) 104 or components of the IAB node(s) 104) may be configured to operate according to the techniques described herein.

In the case of the techniques described herein applied in the context of a disaggregated RAN architecture, one or more components of the disaggregated RAN architecture may be configured to support test as described herein. For example, some operations described as being performed by a UE 115 or a network entity 105 (e.g., a base station 140) may additionally, or alternatively, be performed by one or more components of the disaggregated RAN architecture (e.g., components such as an IAB node, a DU 165, a CU 160, an RU 170, an RIC 175, an SMO system 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IOT) device, an Internet of Everything (IoE) device, or a machine type communications (MTC) device, among other examples, which may be implemented in various objects such as appliances, vehicles, or meters, among other examples.

The UEs 115 described herein may be able to communicate with various types of devices, such as UEs 115 that may sometimes operate as relays, as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via the communication link(s) 125 (e.g., one or more access links) using resources associated with one or more carriers. The term "carrier" may refer to a set of RF spectrum resources having a defined PHY layer structure for supporting the communication link(s) 125. For example, a carrier used for the communication link(s) 125 may include a portion of an RF spectrum band (e.g., a bandwidth part (BWP)) that is operated according to one or more PHY layer channels for a given RAT (e.g., LTE, LTE-A, LTE-A Pro, NR). Each PHY layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities, such as one or more of the network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems, such as the wireless communications system 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to UEs 115 (e.g., one or more UEs) or may include UE-specific search space sets for sending control information to a UE 115 (e.g., a specific UE).

In some examples, a network entity 105 (e.g., a base station 140, an RU 170) may be movable and therefore provide communication coverage for a moving coverage area, such as the coverage area 110. In some examples, coverage areas 110 (e.g., different coverage areas) associated with different technologies may overlap, but the coverage areas 110 (e.g., different coverage areas) may be supported by the same network entity (e.g., a network entity 105). In some other examples, overlapping coverage areas, such as a coverage area 110, associated with different technologies may be supported by different network entities (e.g., the network entities 105). The wireless communications system 100 may include, for example, a heterogeneous network in which different types of the network entities 105 support communications for coverage areas 110 (e.g., different coverage areas) using the same or different RATs.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 may include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs (e.g., one or more of the UEs 115) via a device-to-device (D2D) communication link, such as a D2D communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to one or more of the UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than one hundred kilometers) compared to communications using the smaller frequencies and longer waves of the high frequency (HF) or very high frequency (VHF) portion of the spectrum below 300 MHZ.

The wireless communications system 100 may utilize both licensed and unlicensed RF spectrum bands. For example, the wireless communications system 100 may employ License Assisted Access (LAA), LTE-Unlicensed (LTE-U) RAT, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices. A spatial layer may also be referred to as a transmission layer or other suitable terminology. The quantity of transmission layers supported by a UE 115 may be based on (e.g., a function of) the quantity of receive antennas at the UE 115.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by a transmitting device (e.g., a network entity 105 or a UE 115) along a single beam direction (e.g., a direction associated with the receiving device, such as another network entity 105 or UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a transmitting device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., the communication link(s) 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in relatively poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval. HARQ feedback may include acknowledgement (ACK) messages that indicate successful receipt and processing of a message and non-acknowledgement (NACK) messages that indicate a message was not successfully received and/or processed.

Although the wireless communications system 100 may support a peak throughput that is based on communication parameters such as the maximum quantity of communication resources (e.g., component carriers (CCs), resource blocks (RBs)) and the maximum quantity of transmission layers for a message, the baseline processing time of a UE 115 may limit the communication parameters supported by the UE 115 for a message. To increase throughput for that UE 115, the UE 115 may be scheduled with a relaxed (e.g., lengthened, dilated) timeline that allows the UE 115 to process higher-throughput communication parameters (e.g., more communication resources, more transmission layers) than the baseline timeline.

Figure 2:
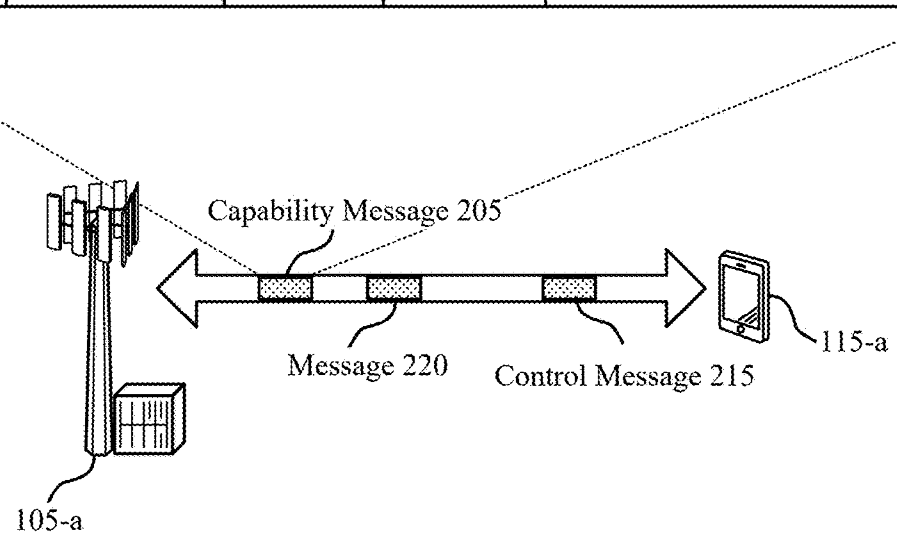
FIG. 2 shows an example of a wireless communications system that supports signaling and selection of communication parameters in accordance with one or more aspects of the present disclosure.

FIG. 2 shows an example of a wireless communications system 200 that supports signaling and selection of communication parameters in accordance with one or more aspects of the present disclosure. The wireless communications system 200 may be an example of the wireless communications system 100 as described with reference to FIG. 1. The wireless communications system 200 may include a network entity 105-*a*, which may be an example of a network entity 105 as described with reference to FIG. 1, and may include a UE 115-*a*, which may be an example of a UE 115 as described with reference to FIG. 1. The network entity 105-*a* may schedule the UE 115 with a relaxed timeline to increase throughput, and the UE 115 may signal combinations of communication parameters to the network entity 105-*a* so that the network entity can select the appropriate communication of communication parameters for the relaxed timeline.

The UE 115-*a* may have one or more baseline processing times for processing messages. For example, the UE 115-*a* may have a baseline processing time, N1, for processing downlink messages (e.g., physical downlink shared channel (PDSCH) messages) received from the network entity 105-*a*. Similarly, the UE 115-*a* may have a baseline processing time, K1, for processing (e.g., preparing) uplink messages (e.g., physical uplink shared channel (PUSCH) messages) for transmission to the network entity 105-*a*. The UE 115-*a* may also have a baseline feedback time for providing feedback (e.g., HARQ feedback) to the network entity 105-*a* for downlink messages.

Together, the baseline processing time N1 and the feedback time may limit the quantity of communication resources and transmission layers the UE 115-*a* can support for a downlink message. Similarly, the baseline processing time K1 may limit the quantity of communication resources and transmission layers the UE 115-*a* can support for an uplink message.

However, the UE 115-*a* may support higher quantities of communication resources and transmission layers if the UE 115-*a* is able to use a relaxed timeline (e.g., a processing time that is longer than the baseline processing time of the UE 115-*a*, a feedback time that is longer than the baseline feedback time). In some scenarios, use of a relaxed processing timeline may be associated with a higher throughput than use of the baseline processing timeline.

To illustrate, consider a scenario in which the peak throughput is achieved with four CCs and eight transmission layers but the baseline processing time of the UE 115-*a* only supports two CCs and eight transmission layers. In such a scenario, scheduling the UE 115-*a* in accordance with the baseline processing time may allow the UE 115-*a* to be scheduled (e.g., in a time divisional duplex (TDD) manner) with three consecutive slots as downlink slots (e.g., for a downlink message), resulting in 50% throughput relative to the peak throughput. However, scheduling the UE 115-*a* in accordance with a relaxed processing time may allow the UE 115-*a* to be scheduled (e.g., in a TDD manner) with the middle slot of the three consecutive slots 'off', resulting in 70% throughput relative to the peak throughput.

To support scheduling of the UE 115-*a* with a relaxed processing timeline, the UE 115-*a* may transmit an indication of communication parameters that are supported by the relaxed processing timeline. For example, the UE 115-*a* may send to the network entity 105-*a* a capability message 205 that indicates one or more processing times, one or more corresponding communication parameters 210, one or more scheduling conditions, or any combination thereof.

As an illustration, the UE 115-*a* may indicate the baseline processing time of the UE 115-*a* (e.g., B1, which may be N1 for downlink messages or K1 for uplink messages) and associated communication parameters 210 such as the baseline quantity of transmission layers (e.g., N) and the baseline quantity of communication resources (e.g., M RBs). Additionally, the UE 115-*a* may indicate a first relaxed processing time (e.g., B1+Offset1) and associated communication parameters 210 such as a first quantity of transmission layers (e.g., N) and a first quantity of communication resources (e.g., M+Delta1 RBs). Additionally or alternatively, the UE 115-*a* may indicate a second relaxed processing time (e.g., B1+Offset2) and associated communication parameters 210 such as a second quantity of transmission layers (e.g., N+1) and a second quantity of communication resources (e.g., M RBs).

In some examples, the UE 115-*a* may indicate scheduling conditions or recommendations associated with the processing times. Examples of scheduling conditions or recommendations include TDD patterns, TDD duty cycles, quantities of slots off in between communications, gap durations between communications, and relaxed feedback latencies. To illustrate, the UE 115-*a* may indicate that for processing time B1+Offset1, the UE 115-*a* should be scheduled with X1 slots off in between communications, with a relaxed feedback latency of L_Fdbck+T1 (where L_Fdbck is the baseline feedback latency), or both. As another illustration, the UE 115-*a* may indicate that for processing time B1+Offset2, the UE 115-*a* should be scheduled with X2 slots off in between communications, with a relaxed feedback latency of L_Fdbck+T2, or both.

In some examples, the UE 115-*a* and the network entity 105-*a* may be configured with a table with entries that indicate different combinations of processing times, associated communication parameters, and/or associated scheduling conditions. In such examples, the UE 115-*a* may indicate a combination of a processing time, associated communications parameters, and/or associated scheduling conditions by indicating an index into the table. For example, the UE 115-*a* may indicate the relaxed processing time B1+Offset1, the first quantity of transmission layer N, and the first quantity of communication resources (e.g., M+Delta1 RBs) by transmitting an indication of index 1. In other examples, there may be separate tables for the processing times and communication parameters. In such examples, the UE 115-*a* may indicate a processing time by indicating an index for the processing time table and the UE 115-*a* may indicate one or more communication parameters by indicating an index for the communication parameters table. In some examples, the UE 115-*a* may provide an explicit indication of one or more of the processing time, associated communications parameters, and/or associated scheduling conditions.

Based on the information indicated by the capability message 205, the network entity 105-*a* may select a processing time for the UE 115-*a* as well as the associated communication parameters 210. The network entity 105-*a* may also schedule (e.g., using the control message 215) the UE 115-*a* for communications in accordance with the processing time (e.g., in a manner that allows the UE 115-*a* enough time to process a message communicated with the selected communication parameters), in accordance with the scheduling condition(s), or both. The control message 215 may be a MAC control element (MAC-CE) message, an RRC message, a downlink control information (DCI) message, or any other suitable control message.

As an example, the network entity 105-*a* may schedule the UE 115-*a* to receive or transmit a message 220 that the UE 115-*a* is to process using the selected processing time and that is to be communicated with the selected communication parameters 210. The message 220 may be a downlink message transmitted by the network entity 105-*a* (and received by the UE 115-*a*) or the message 220 may be an uplink message transmitted by the UE 115-*a* (and received by the network entity 105-*a*).

Thus, the UE 115-*a* may be scheduled with a relaxed timeline, which may increase the throughput and efficiency of the wireless communications system 200. In some examples, the relaxed timeline may be at least partially achieved via discontinuous scheduling in which the UE 115-*a* is scheduled with gaps between communications. The gaps can be scheduled by changing the duty cycle of the TDD communications scheduled for the UE 115-*a*, by dynamically inserting gaps between communications scheduled for the UE 115-*a*, or both. So, in some examples, discontinuous scheduling can involve the use of guaranteed gaps or sub-scheduling over time resources (e.g., slots, symbols, etc.) where some of these slots have zero resource block allocation. Different discontinuous scheduling (e.g., different TDD duty cycles, different gaps) may correspond to different communications parameters (e.g., quantity of resource blocks the UE 115-*a* is capable of processing, quantity of transmission layers the UE 115-*a* is capable of processing).

Figure 3:
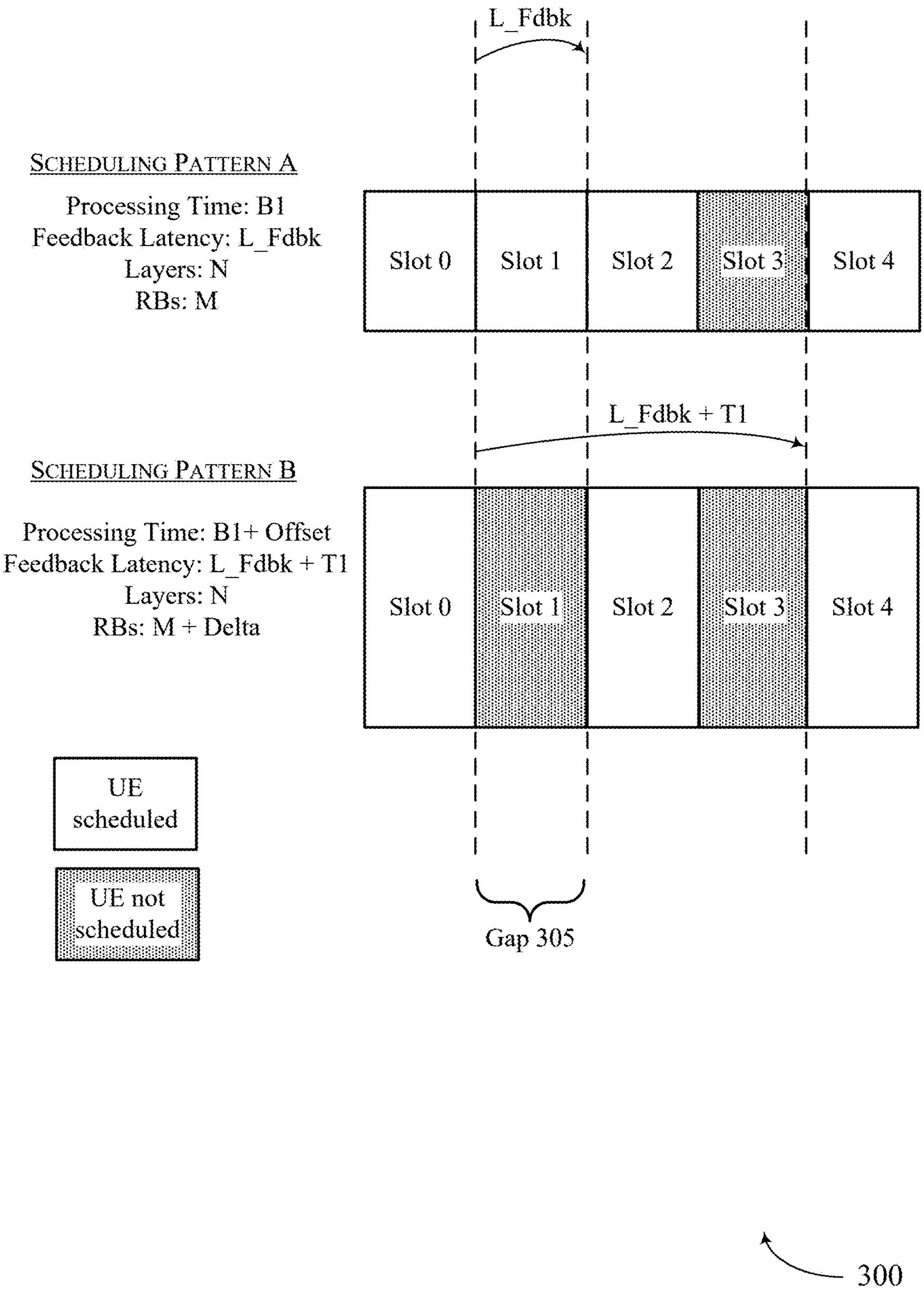
FIG. 3 shows an example of communication resources that support signaling and selection of communication parameters in a wireless communications system in accordance with one or more aspects of the present disclosure.

FIG. 3 shows an example of slots 300 that support signaling and selection of communication parameters in a wireless communications system in accordance with one or more aspects of the present disclosure. The slots 300 may be scheduled according to a first scheduling pattern A or according to a second scheduling pattern B. The first scheduling pattern A may be associated with a baseline timeline for a UE 115 and the second scheduling pattern B may be associated with a relaxed timeline for the UE 115. For example, the first scheduling pattern A may schedule the UE 115 in accordance with the baseline processing time (e.g., B1) of the UE 115 and with a baseline feedback latency (L_Fdbk). Similarly, the second scheduling pattern B may schedule the UE 115 in accordance with a relaxed processing time (e.g., B1+Offset) and with a relaxed feedback latency (L_Fdbk+T1). Use of the second scheduling pattern B may allow for increased throughput relative to the first scheduling pattern A.

The UE may be scheduled in a TDD manner, where slots scheduled for communication by the UE (either uplink or downlink) (referred to as "on" slots) are shown in white and slots not scheduled for communication by the UE (referred to as "off" slots) are shown in grey. In the first scheduling pattern A, which may be in accordance with the baseline processing time B1, the UE may be scheduled with a TDD pattern DDDSU, where D denotes a slot scheduled for downlink communications, U denotes a slot scheduled for uplink communications, and S denotes a special slot for switching between uplink and downlink communications. In the second scheduling pattern B, which may be in accordance with the relaxed processing time B1+Offset, the UE may be scheduled with a TDD pattern DxDxU, where x denotes a slot that the UE is "off." Thus, the duty cycle of the TDD pattern may be based on the processing time of the UE, where the duty cycle refers to the ratio of 'on' slots to 'off' slots.

In other examples, the TDD pattern for the first scheduling pattern A may be DDDSU and the TDD pattern for the second scheduling pattern may be DxDSU. In other examples, the TDD pattern for the first scheduling pattern A may be DDDSU and the TDD pattern for the second scheduling pattern may be DDxxU.

In the first scheduling pattern A, the UE (due to the baseline processing time B1 and the baseline feedback latency L_Fdbk) may support communications that use N transmission layers and M communication resources (e.g., RBs). For example, the UE may be capable of processing downlink communications that use N transmission layers and M communication resources, may be capable of preparing uplink communications that use N transmission layers and M communication resources, or both. In the second scheduling pattern B, the UE (due to the relaxed processing time B1+Offset and the relaxed feedback latency L_Fdbk+T1) may support communications that use N transmission layers and M+Delta communication resources (e.g., RBs). For example, the UE may be capable of processing downlink communications that use N transmission layers and M+Delta communication resources, may be capable of preparing uplink communications that use N transmission layers and M+Delta communication resources, or both.

The baseline feedback latency L_Fdbk may represent the amount of time the UE has to provide feedback for a downlink communication in the first scheduling pattern A. For example, the baseline feedback latency L_Fdbk may be one slot, which may be measured from the last symbol of the corresponding downlink communication slot (e.g., slot 0) to the first symbol of the feedback slot (e.g., slot 1). The relaxed feedback latency L_Fdbk+T1 may represent the amount of time the UE has to provide feedback for a downlink communication in the second scheduling pattern B. For example, the relaxed feedback latency L_Fdbk+T1 may be three slots, which may be measured from the last symbol of the corresponding downlink communication slot (e.g., slot 0) to the first symbol of the feedback slot (e.g., slot 4).

Other endpoints for feedback latency are contemplated and within the scope of the present disclosure. For example, the feedback latency may be measured from the first symbol of the corresponding downlink communication slot to the first symbol of the feedback slot.

The first scheduling pattern A and the second scheduling pattern B may be determined by a network entity. The second scheduling pattern B may be determined based on an indication of the relaxed processing time and associated communication parameters. In some examples, the second scheduling pattern B may be determined based on a recommendation by the UE. In some examples, the second scheduling pattern B may be in accordance with (e.g., based on) one or more scheduling conditions indicated by the UE. For example, the UE may indicate that the UE can support the communication parameters associated with the relaxed processing time if the UE is scheduled with a gap 305 that has a threshold duration (e.g., one slot) between communications. As another example, the UE may indicate that the UE can support the communication parameters associated with the relaxed processing time if the UE is scheduled with a certain ratio of 'on' slots to 'off' slots (e.g., 1:3).

The network entity may select between the first scheduling pattern A and the second scheduling pattern B based on one or more metrics associated with the scheduling patterns. For example, the network entity may select the second scheduling pattern B for the UE based on the second scheduling pattern having a higher throughput than the first scheduling pattern A. As another example, the network entity may select the second scheduling pattern B for the UE based on a latency tolerance of the message to be communicated.

Thus, the UE may be scheduled with a relaxed timeline, which may increase the efficiency of the wireless communications system.

Figure 4:
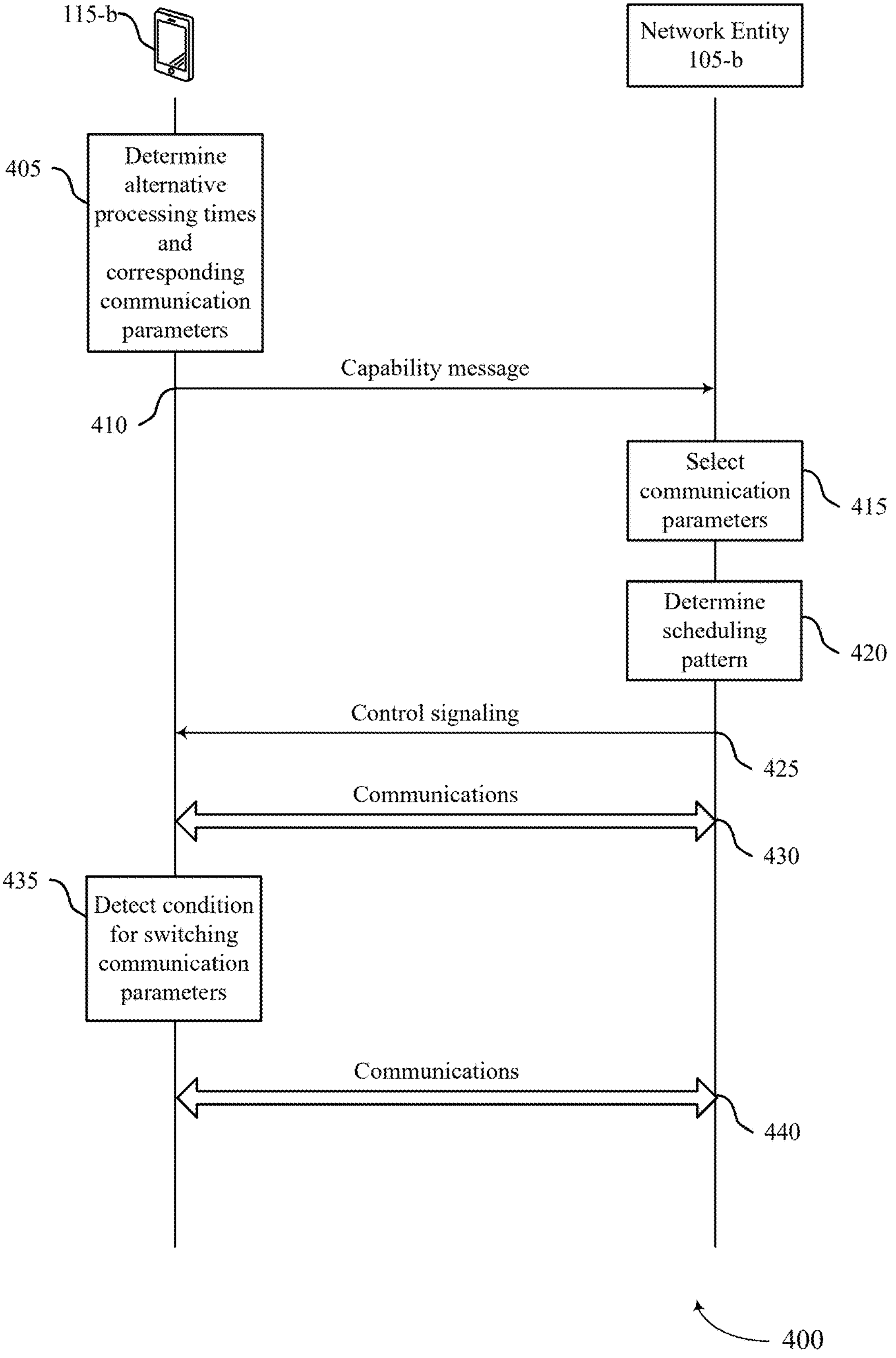
FIG. 4 shows an example of a process flow that supports signaling and selection of communication parameters in a wireless communications system in accordance with one or more aspects of the present disclosure.

FIG. 4 shows an example of a process flow 400 that supports signaling and selection of communication parameters in a wireless communications system in accordance with one or more aspects of the present disclosure. The process flow 400 may be implemented by a UE 115-*b* and a network entity 105-*b*. The UE 115-*b* may be an example of a UE 115 as described herein and the network entity 105-*b* may be an example of a network entity 105 as described herein. The UE 115-*b* may provide information to the network entity 105-*b* that allows the network entity 105-*b* to schedule the UE 115-*b* with a relaxed timeline and higher-throughput communication parameters (e.g., relative to a baseline timeline and lower-throughput communication parameters), which may increase the efficiency of the wireless communications system.

At 405, the UE 115-*b* may determine one or more processing times for communications and corresponding communication parameters supported by the UE 115-*b*. For example, the UE 115-*b* may determine a baseline processing time (e.g., N1 for downlink communications, K1 for uplink communications) and corresponding baseline communication parameters (e.g., a baseline quantity of communication resources, a baseline quantity of transmission layers) for the baseline processing time. Additionally, the UE 115-*b* may determine a relaxed processing time (e.g., a processing time that is longer than the baseline processing time) and corresponding enhanced communication parameters (e.g., a higher quantity of communication resources than the baseline quantity of communication resources, a higher quantity of transmission layers than the baseline quantity of transmission layers) for the relaxed processing time.

In some examples, the UE 115-*b* may also determine one or more respective scheduling conditions associated with (e.g., to be used with) the processing times, such as a baseline feedback latency for the baseline processing time and a relaxed feedback latency (e.g., a feedback latency that is longer than the baseline feedback latency) for the relaxed processing time.

At 410, the UE 115-*b* may send (e.g., in a capability message) an indication of the processing times and the communication parameters determined at 405. In some examples, the indication may be one or more indices into one or more tables that have entries of processing times and corresponding communication parameters. In some examples, the UE 115-*b* may indicate the scheduling condition(s) associated with the processing times.

At 415, the network entity 105-*b* may select a processing time and the corresponding communication parameters for use in subsequent communications with the UE 115-*b*. For example, the network entity 105-*b* may select the relaxed processing time and the enhanced communication parameters for use in subsequent communications with the UE 115-*b*. The network entity 105-*b* may select the relaxed processing time and the enhanced communication parameters based on the relaxed processing time and the enhanced communication parameters being associated with a greater throughput (or other efficiency metric) than the baseline processing time and the baseline communication parameters.

At 420, the network entity 105-*b* may determine a scheduling pattern (e.g., a TDD pattern) for communications with the UE 115-*b*. The network entity 105-*b* may determine the scheduling pattern in accordance with the selected processing time. In some examples, the network entity 105-*b* may determine the scheduling pattern based on one or more scheduling conditions or recommendations from the UE 115-*b*.

At 425, the network entity 105-*b* may transmit control signaling to the UE 115-*b*. The control signaling may include one or more control messages, which may be MAC-CE messages, RRC messages, or DCI messages. The control signaling may indicate the relaxed processing time and the corresponding enhanced communication parameters. The control signaling may also schedule the UE 115-*b* (e.g., with the scheduling pattern) for communications in accordance with the relaxed processing time (and potentially the relaxed feedback latency). For example, the control signaling may schedule the UE 115-*b* for communications in a manner that allows the UE 115-*b* to process the communications within the relaxed processing time (but outside the baseline processing time). In some examples, the control signaling may include an indication of a trigger condition for the UE 115-*b* to switch back to the baseline processing time and baseline communication parameters. For example, the control signaling may include an amount of time that the relaxed processing time and enhanced communication parameters are applicable.

At 430, the UE 115-*b* and the network entity 105-*b* may engage in communications in accordance with the processing time and communication parameters indicated by the control signaling at 425. For example, the UE 115-*b* may receive a downlink message that is communicated using the enhanced communication parameters, may process the downlink message in accordance with the relaxed processing time, and may transmit feedback for the downlink message in accordance with the relaxed feedback latency. Additionally or alternatively, the UE 115-*b* may process (e.g., prepare) an uplink message in accordance with the relaxed processing time and may transmit the uplink message using the enhanced communication parameters.

At 435, the UE 115-*b* may detect that a condition for switching to the baseline processing time and baseline communication parameters has been satisfied. For example, the UE 115-*b* may determine that a timer associated with the relaxed processing time and enhanced communication parameters has expired. As another example, the UE 115-*b* may receive control signaling (e.g., a MAC-CE message, an RRC message, a DCI message) that indicates the UE 115-*b* is to switch to the baseline processing time and baseline communication parameters. In such examples, the control signaling may be transmitted by the network entity 105-*b* based on the network entity 105-*b* determining to switch the processing time and communication parameters for the UE 115-*b*. As another example, the UE 115-*b* may determine that the UE 115-*b* has been scheduled with a duty cycle associated with the baseline processing time and baseline communication parameters.

At 440, the UE 115-*b* and the network entity 105-*b* may engage in communications in accordance with the baseline processing time and baseline communication parameters. For example, the UE 115-*b* may receive a downlink message that is communicated using the baseline communication parameters, may process the downlink message in accordance with the baseline processing time, and may transmit feedback for the downlink message in accordance with the baseline feedback latency. Additionally or alternatively, the UE 115-*b* may process (e.g., prepare) an uplink message in accordance with the baseline processing time and may transmit the uplink message using the baseline communication parameters.

Thus, the UE 115-*b* may be scheduled with a relaxed timeline and higher-throughput communication parameters (e.g., relative to a baseline timeline and lower-throughput communication parameters), which may increase the efficiency of the wireless communications system.

Alternative examples of the foregoing may be implemented, where some operations are performed in a different order than described, are performed in parallel, or are not performed at all. In some cases, operations may include additional features not mentioned herein, or further operations may be added. Additionally, certain operations may be performed multiple times or certain combinations of operations may repeat or cycle.

Figure 5:
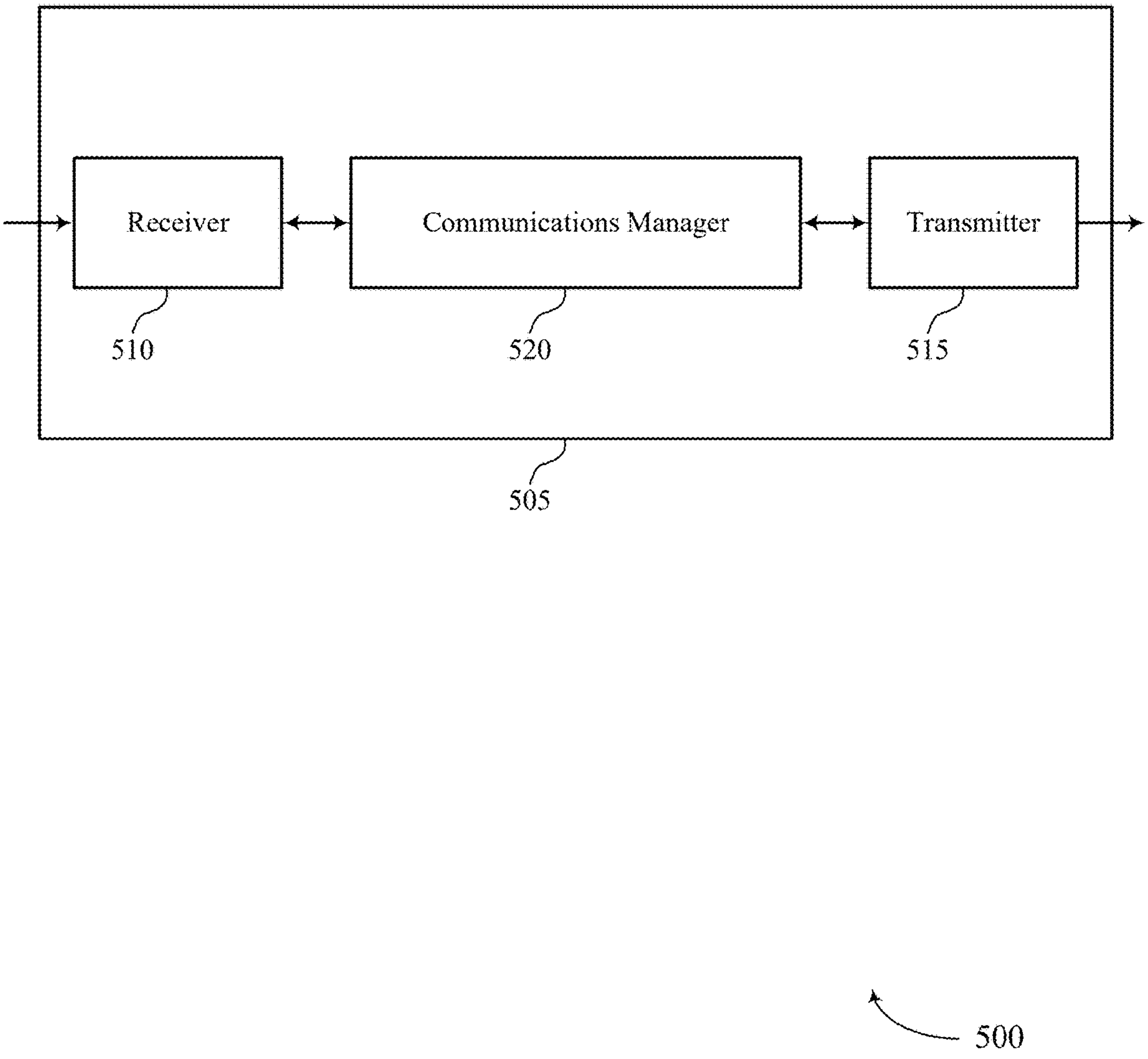
FIGS. 5 and 6 show block diagrams of devices that support signaling and selection of communication parameters in a wireless communications system in accordance with one or more aspects of the present disclosure.

FIG. 5 shows a block diagram 500 of a device 505 that supports signaling and selection of communication parameters in a wireless communications system in accordance with one or more aspects of the present disclosure. The device 505 may be an example of aspects of a UE 115 as described herein. The device 505 may include a receiver 510, a transmitter 515, and a communications manager 520. The device 505, or one or more components of the device 505 (e.g., the receiver 510, the transmitter 515, the communications manager 520), may include at least one processor, which may be coupled with at least one memory, to, individually or collectively, support or enable the described techniques. Each of these components may be in communication with one another (e.g., via one or more buses).

The receiver 510 may provide a means for receiving information such as packets, user data, control information, or any combination thereof associated with various information channels (e.g., control channels, data channels, information channels related to signaling and selection of communication parameters in a wireless communications system). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to signaling and selection of communication parameters in a wireless communications system). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations or components thereof may be examples of means for performing various aspects of signaling and selection of communication parameters in a wireless communications system as described herein. For example, the communications manager 520, the receiver 510, the transmitter 515, or various combinations or components thereof may be capable of performing one or more of the functions described herein.

In some examples, the communications manager 520, the receiver 510, the transmitter 515, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 520, the receiver 510, the transmitter 515, or various combinations or components thereof may be implemented in code (e.g., as communications management software or firmware) executed by at least one processor (e.g., referred to as a processor-executable code). If implemented in code executed by at least one processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communications in accordance with examples as disclosed herein. For example, the communications manager 520 is capable of, configured to, or operable to support a means for transmitting a first indication of a first quantity of communication resources associated with a first processing time in which the UE is capable of processing a message that is transmitted over a set of transmission layers using the first quantity of communication resources. The communications manager 520 is capable of, configured to, or operable to support a means for transmitting a second indication of a second quantity of communication resources associated with a second processing time in which the UE is capable of processing a message that is transmitted over the set of transmission layers using the second quantity of communication resources, where the second quantity of communication resources is greater than the first quantity of communication resources, and the second processing time is greater than the first processing time. The communications manager 520 is capable of, configured to, or operable to support a means for receiving control signaling, for a scheduled message and based on the first indication and the second indication, that indicates one of the first quantity of communication resources or the second quantity of communication resources and that schedules the UE in accordance with one of the first processing time or the second processing time.

By including or configuring the communications manager 520 in accordance with examples as described herein, the device 505 (e.g., at least one processor controlling or otherwise coupled with the receiver 510, the transmitter 515, the communications manager 520, or a combination thereof) may support techniques for more efficient utilization of communication resources.

Figure 6:
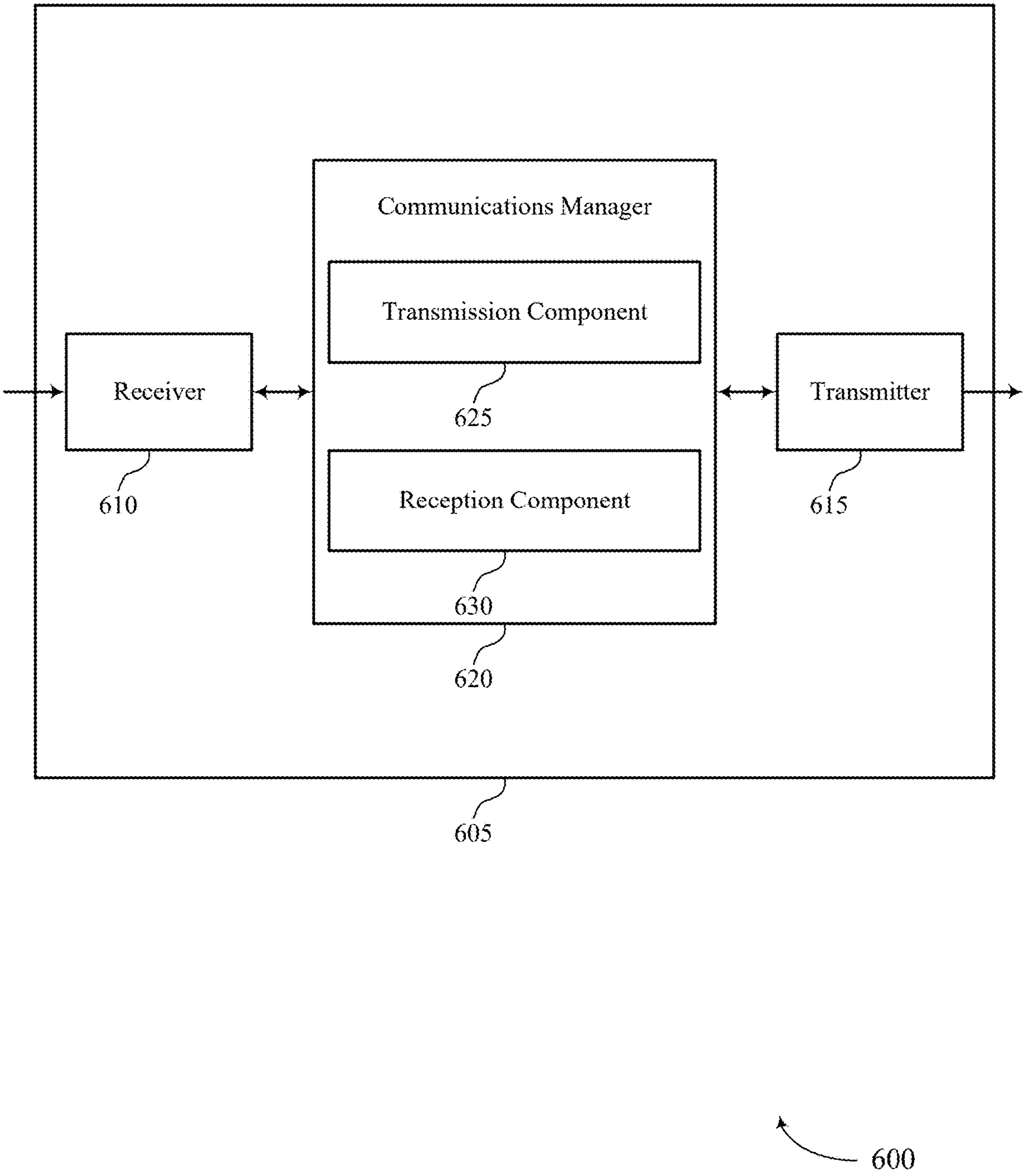

FIG. 6 shows a block diagram 600 of a device 605 that supports signaling and selection of communication parameters in a wireless communications system in accordance with one or more aspects of the present disclosure. The device 605 may be an example of aspects of a device 505 or a UE 115 as described herein. The device 605 may include a receiver 610, a transmitter 615, and a communications manager 620. The device 605, or one of more components of the device 605 (e.g., the receiver 610, the transmitter 615, the communications manager 620), may include at least one processor, which may be coupled with at least one memory, to support the described techniques. Each of these components may be in communication with one another (e.g., via one or more buses).

The receiver 610 may provide a means for receiving information such as packets, user data, control information, or any combination thereof associated with various information channels (e.g., control channels, data channels, information channels related to signaling and selection of communication parameters in a wireless communications system). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to signaling and selection of communication parameters in a wireless communications system). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of signaling and selection of communication parameters in a wireless communications system as described herein. For example, the communications manager 620 may include a transmission component 625 a reception component 630, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications in accordance with examples as disclosed herein. The transmission component 625 is capable of, configured to, or operable to support a means for transmitting a first indication of a first quantity of communication resources associated with a first processing time in which the UE is capable of processing a message that is transmitted over a set of transmission layers using the first quantity of communication resources. The transmission component 625 is capable of, configured to, or operable to support a means for transmitting a second indication of a second quantity of communication resources associated with a second processing time in which the UE is capable of processing a message that is transmitted over the set of transmission layers using the second quantity of communication resources, where the second quantity of communication resources is greater than the first quantity of communication resources, and the second processing time is greater than the first processing time. The reception component 630 is capable of, configured to, or operable to support a means for receiving control signaling, for a scheduled message and based on the first indication and the second indication, that indicates one of the first quantity of communication resources or the second quantity of communication resources and that schedules the UE in accordance with one of the first processing time or the second processing time.

Figure 7:
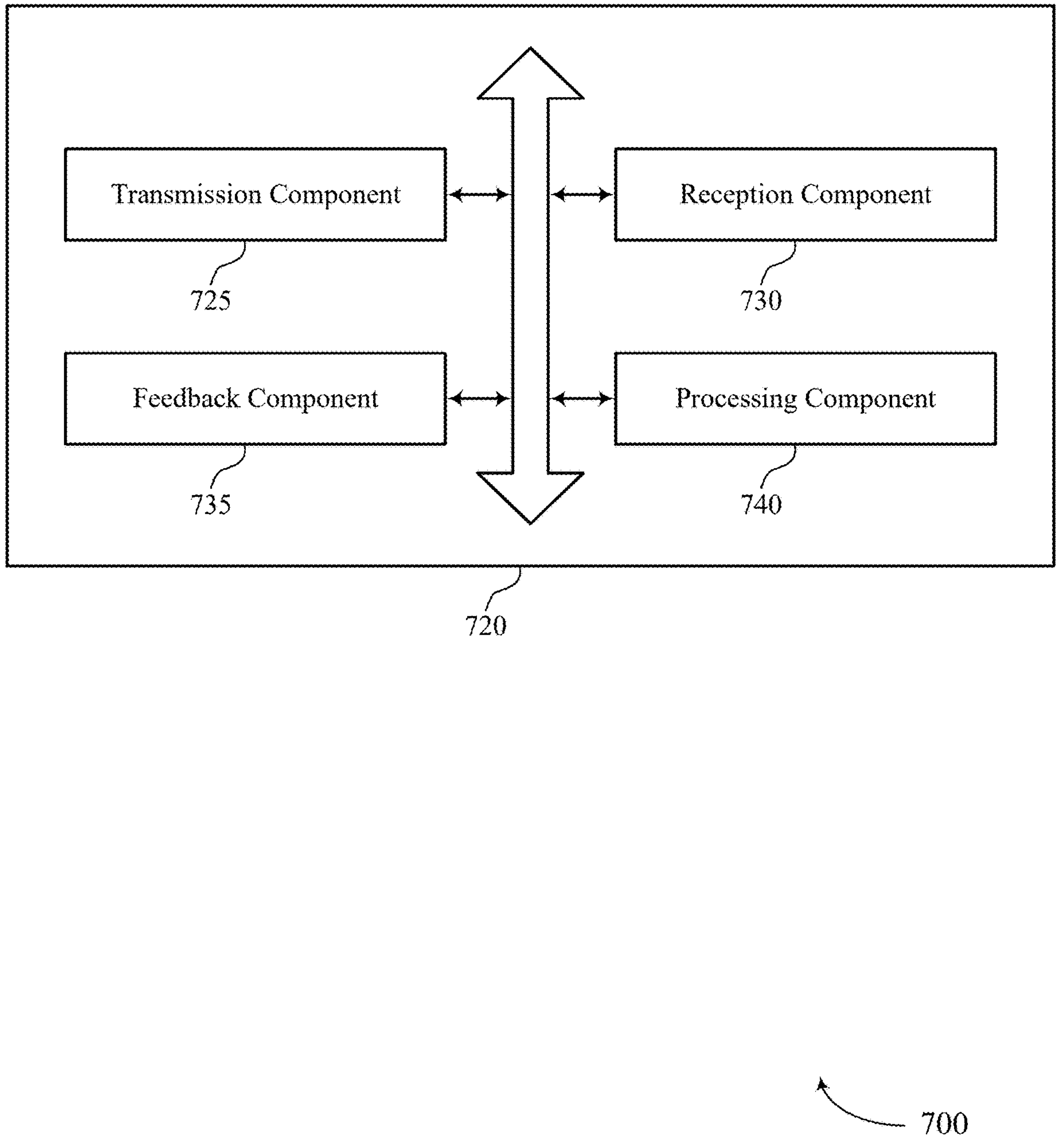
FIG. 7 shows a block diagram of a communications manager that supports signaling and selection of communication parameters in a wireless communications system in accordance with one or more aspects of the present disclosure.

FIG. 7 shows a block diagram 700 of a communications manager 720 that supports signaling and selection of communication parameters in a wireless communications system in accordance with one or more aspects of the present disclosure. The communications manager 720 may be an example of aspects of a communications manager 520, a communications manager 620, or both, as described herein. The communications manager 720, or various components thereof, may be an example of means for performing various aspects of signaling and selection of communication parameters in a wireless communications system as described herein. For example, the communications manager 720 may include a transmission component 725, a reception component 730, a feedback component 735, a processing component 740, or any combination thereof. Each of these components, or components or subcomponents thereof (e.g., one or more processors, one or more memories), may communicate, directly or indirectly, with one another (e.g., via one or more buses).

The communications manager 720 may support wireless communications in accordance with examples as disclosed herein. The transmission component 725 is capable of, configured to, or operable to support a means for transmitting a first indication of a first quantity of communication resources associated with a first processing time in which the UE is capable of processing a message that is transmitted over a set of transmission layers using the first quantity of communication resources. In some examples, the transmission component 725 is capable of, configured to, or operable to support a means for transmitting a second indication of a second quantity of communication resources associated with a second processing time in which the UE is capable of processing a message that is transmitted over the set of transmission layers using the second quantity of communication resources, where the second quantity of communication resources is greater than the first quantity of communication resources, and the second processing time is greater than the first processing time. The reception component 730 is capable of, configured to, or operable to support a means for receiving control signaling, for a scheduled message and based on the first indication and the second indication, that indicates one of the first quantity of communication resources or the second quantity of communication resources and that schedules the UE in accordance with one of the first processing time or the second processing time.

In some examples, the first processing time is associated with a first latency for providing feedback, and the reception component 730 is capable of, configured to, or operable to support a means for receiving the scheduled message based on the control signaling. In some examples, the first processing time is associated with a first latency for providing feedback, and the feedback component 735 is capable of, configured to, or operable to support a means for transmitting a feedback message for the scheduled message according to a second latency that is longer than the first latency.

In some examples, the control signaling indicates the second latency.

In some examples, the control signaling indicates the second quantity of communication resources and schedules the UE in accordance with the second processing time. In some examples, the control signaling schedules the UE with a gap in communications relative to receipt of the scheduled message. In some examples, a duration of the gap is based on the second processing time.

In some examples, the second processing time is based on the second quantity of communication resources, the set of transmission layers, and a baseline processing time for the UE to process PDSCH messages.

In some examples, the processing component 740 is capable of, configured to, or operable to support a means for processing a second scheduled message according to the first processing time based on expiration of a timer associated with the second processing time.

In some examples, the processing component 740 is capable of, configured to, or operable to support a means for processing a second scheduled message according to the first processing time based on receiving an indication to process the second scheduled message according to the first processing time.

In some examples, the processing component 740 is capable of, configured to, or operable to support a means for processing a second scheduled message according to the first processing time based on receiving an indication of a TDD duty cycle associated with the first processing time.

In some examples, the second indication also indicates the second processing time associated with the second quantity of communication resources.

In some examples, the second processing time is indicated as a duration of time, as a TDD duty cycle value or pattern, or as a quantity of slots.

In some examples, the first quantity of communication resources and the second quantity of communication resources both include resource blocks.

In some examples, the first quantity of communication resources and the second quantity of communication resources both include component carriers.

In some examples, the second processing time is associated with a reduced throughput relative to a peak throughput for the UE, a relaxed feedback timeline relative to a baseline feedback timeline for the UE, or both.

Figure 8:
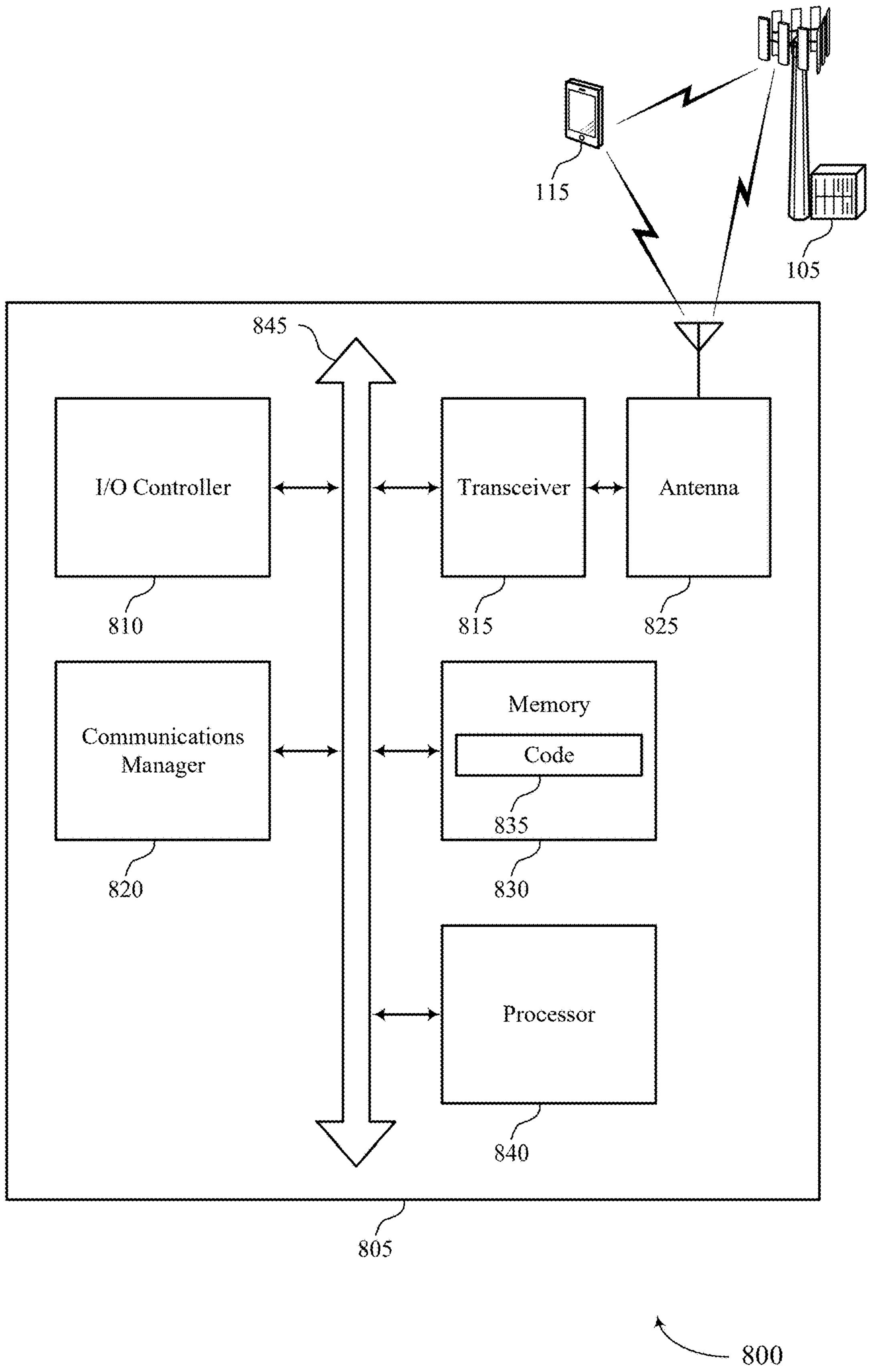
FIG. 8 shows a diagram of a system including a device that supports signaling and selection of communication parameters in a wireless communications system in accordance with one or more aspects of the present disclosure.

FIG. 8 shows a diagram of a system 800 including a device 805 that supports signaling and selection of communication parameters in a wireless communications system in accordance with one or more aspects of the present disclosure. The device 805 may be an example of or include components of a device 505, a device 605, or a UE 115 as described herein. The device 805 may communicate (e.g., wirelessly) with one or more other devices (e.g., network entities 105, UEs 115, or a combination thereof). The device 805 may include components for bi-directional voice and data communications including components for transmitting and receiving communications, such as a communications manager 820, an input/output (I/O) controller, such as an I/O controller 810, a transceiver 815, one or more antennas 825, at least one memory 830, code 835, and at least one processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally, or alternatively, the I/O controller 810 may represent or interact with a modem, a keyboard, a mouse, a touchscreen, or a similar device. In some cases, the I/O controller 810 may be implemented as part of one or more processors, such as the at least one processor 840. In some cases, a user may interact with the device 805 via the I/O controller 810 or via hardware components controlled by the I/O controller 810.

In some cases, the device 805 may include a single antenna. However, in some other cases, the device 805 may have more than one antenna, which may be capable of concurrently transmitting or receiving multiple wireless transmissions. The transceiver 815 may communicate bi-directionally via the one or more antennas 825 using wired or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The at least one memory 830 may include random access memory (RAM) and read-only memory (ROM). The at least one memory 830 may store computer-readable, computer-executable, or processor-executable code, such as the code 835. The code 835 may include instructions that, when executed by the at least one processor 840, cause the device 805 to perform various functions described herein. The code 835 may be stored in a non-transitory computer-readable medium such as system memory or another type of memory. In some cases, the code 835 may not be directly executable by the at least one processor 840 but may cause a computer (e.g., when compiled and executed) to perform functions described herein. In some cases, the at least one memory 830 may include, among other things, a basic I/O system (BIOS) which may control basic hardware or software operation such as the interaction with peripheral components or devices.

The at least one processor 840 may include one or more intelligent hardware devices (e.g., one or more general-purpose processors, one or more DSPs, one or more CPUs, one or more graphics processing units (GPUs), one or more neural processing units (NPUs) (also referred to as neural network processors or deep learning processors (DLPs)), one or more microcontrollers, one or more ASICs, one or more FPGAs, one or more programmable logic devices, discrete gate or transistor logic, one or more discrete hardware components, or any combination thereof). In some cases, the at least one processor 840 may be configured to operate a memory array using a memory controller. In some other cases, a memory controller may be integrated into the at least one processor 840. The at least one processor 840 may be configured to execute computer-readable instructions stored in a memory (e.g., the at least one memory 830) to cause the device 805 to perform various functions (e.g., functions or tasks supporting signaling and selection of communication parameters in a wireless communications system). For example, the device 805 or a component of the device 805 may include at least one processor 840 and at least one memory 830 coupled with or to the at least one processor 840, the at least one processor 840 and the at least one memory 830 configured to perform various functions described herein.

In some examples, the at least one processor 840 may include multiple processors and the at least one memory 830 may include multiple memories. One or more of the multiple processors may be coupled with one or more of the multiple memories, which may, individually or collectively, be configured to perform various functions described herein. In some examples, the at least one processor 840 may be a component of a processing system, which may refer to a system (such as a series) of machines, circuitry (including, for example, one or both of processor circuitry (which may include the at least one processor 840) and memory circuitry (which may include the at least one memory 830)), or components, that receives or obtains inputs and processes the inputs to produce, generate, or obtain a set of outputs. The processing system may be configured to perform one or more of the functions described herein. For example, the at least one processor 840 or a processing system including the at least one processor 840 may be configured to, configurable to, or operable to cause the device 805 to perform one or more of the functions described herein. Further, as described herein, being "configured to," being "configurable to," and being "operable to" may be used interchangeably and may be associated with a capability, when executing code 835 (e.g., processor-executable code) stored in the at least one memory 830 or otherwise, to perform one or more of the functions described herein.

The communications manager 820 may support wireless communications in accordance with examples as disclosed herein. For example, the communications manager 820 is capable of, configured to, or operable to support a means for transmitting a first indication of a first quantity of communication resources associated with a first processing time in which the UE is capable of processing a message that is transmitted over a set of transmission layers using the first quantity of communication resources. The communications manager 820 is capable of, configured to, or operable to support a means for transmitting a second indication of a second quantity of communication resources associated with a second processing time in which the UE is capable of processing a message that is transmitted over the set of transmission layers using the second quantity of communication resources, where the second quantity of communication resources is greater than the first quantity of communication resources, and the second processing time is greater than the first processing time. The communications manager 820 is capable of, configured to, or operable to support a means for receiving control signaling, for a scheduled message and based on the first indication and the second indication, that indicates one of the first quantity of communication resources or the second quantity of communication resources and that schedules the UE in accordance with one of the first processing time or the second processing time.

By including or configuring the communications manager 820 in accordance with examples as described herein, the device 805 may support techniques for more efficient utilization of communication resources.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the at least one processor 840, the at least one memory 830, the code 835, or any combination thereof. For example, the code 835 may include instructions executable by the at least one processor 840 to cause the device 805 to perform various aspects of signaling and selection of communication parameters in a wireless communications system as described herein, or the at least one processor 840 and the at least one memory 830 may be otherwise configured to, individually or collectively, perform or support such operations.

Figure 9:
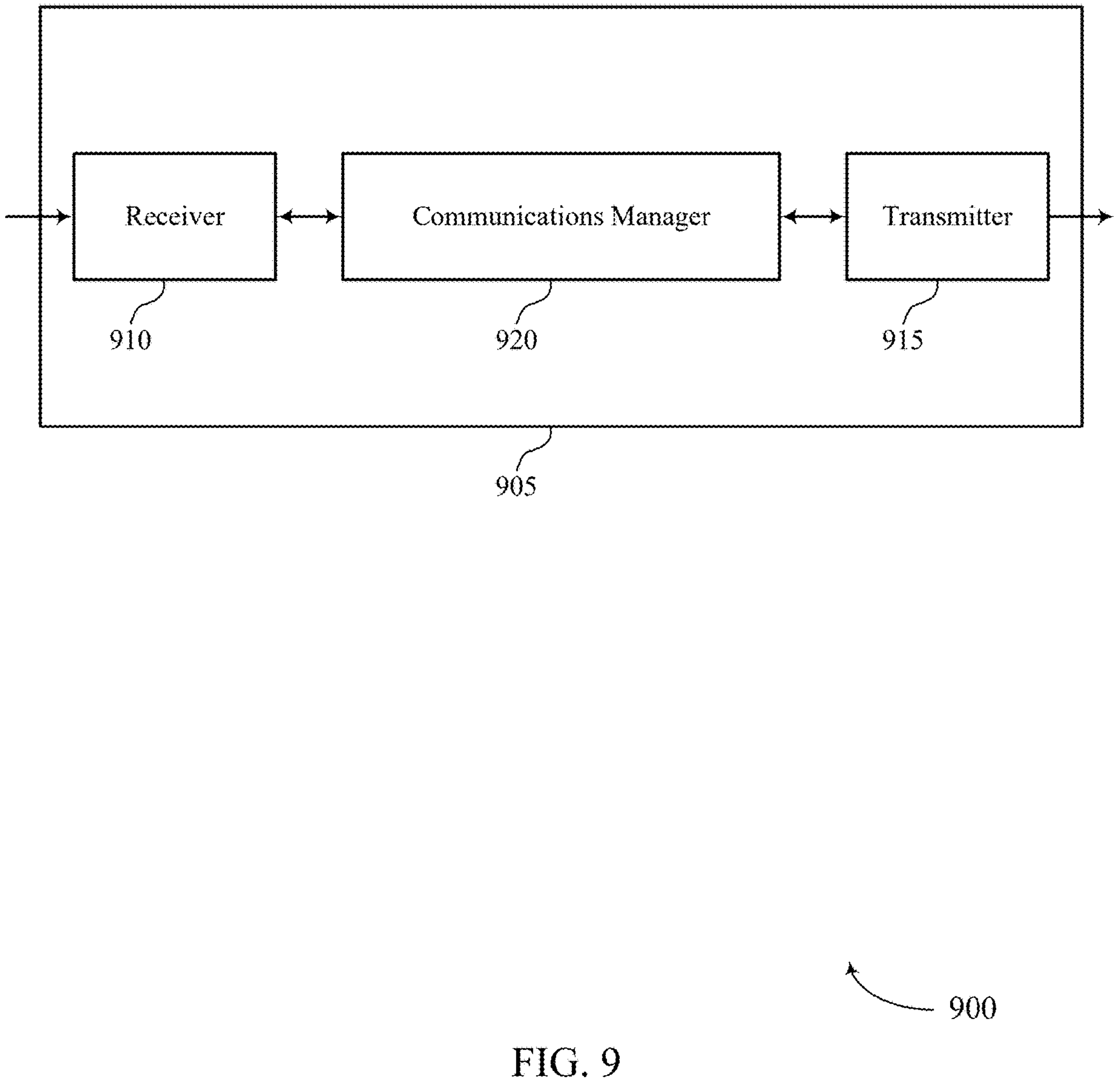
FIGS. 9 and 10 show block diagrams of devices that support signaling and selection of communication parameters in a wireless communications system in accordance with one or more aspects of the present disclosure.

FIG. 9 shows a block diagram 900 of a device 905 that supports signaling and selection of communication parameters in a wireless communications system in accordance with one or more aspects of the present disclosure. The device 905 may be an example of aspects of a network entity 105 as described herein. The device 905 may include a receiver 910, a transmitter 915, and a communications manager 920. The device 905, or one or more components of the device 905 (e.g., the receiver 910, the transmitter 915, the communications manager 920), may include at least one processor, which may be coupled with at least one memory, to, individually or collectively, support or enable the described techniques. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The communications manager 920, the receiver 910, the transmitter 915, or various combinations or components thereof may be examples of means for performing various aspects of signaling and selection of communication parameters in a wireless communications system as described herein. For example, the communications manager 920, the receiver 910, the transmitter 915, or various combinations or components thereof may be capable of performing one or more of the functions described herein.

In some examples, the communications manager 920, the receiver 910, the transmitter 915, or various combinations or components thereof may be implemented in hardware (e.g., in communications management circuitry). The hardware may include at least one of a processor, a DSP, a CPU, an ASIC, an FPGA or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 920, the receiver 910, the transmitter 915, or various combinations or components thereof may be implemented in code (e.g., as communications management software or firmware) executed by at least one processor (e.g., referred to as a processor-executable code). If implemented in code executed by at least one processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communications in accordance with examples as disclosed herein. For example, the communications manager 920 is capable of, configured to, or operable to support a means for receiving a first indication of a first quantity of communication resources associated with a first processing time in which a UE is capable of processing a message that is transmitted over a set of transmission layers using the first quantity of communication resources. The communications manager 920 is capable of, configured to, or operable to support a means for receiving a second indication of a second quantity of communication resources associated with a second processing time in which the UE is capable of processing a message that is transmitted over the set of transmission layers using the second quantity of communication resources, where the second quantity of communication resources is greater than the first quantity of communication resources, and the second processing time is greater than the first processing time. The communications manager 920 is capable of, configured to, or operable to support a means for transmitting control signaling, for a scheduled message and based on the first indication and the second indication, that indicates one of the first quantity of communication resources or the second quantity of communication resources and that schedules the UE in accordance with one of the first processing time or the second processing time.

By including or configuring the communications manager 920 in accordance with examples as described herein, the device 905 (e.g., at least one processor controlling or otherwise coupled with the receiver 910, the transmitter 915, the communications manager 920, or a combination thereof) may support techniques for more efficient utilization of communication resources.

Figure 10:
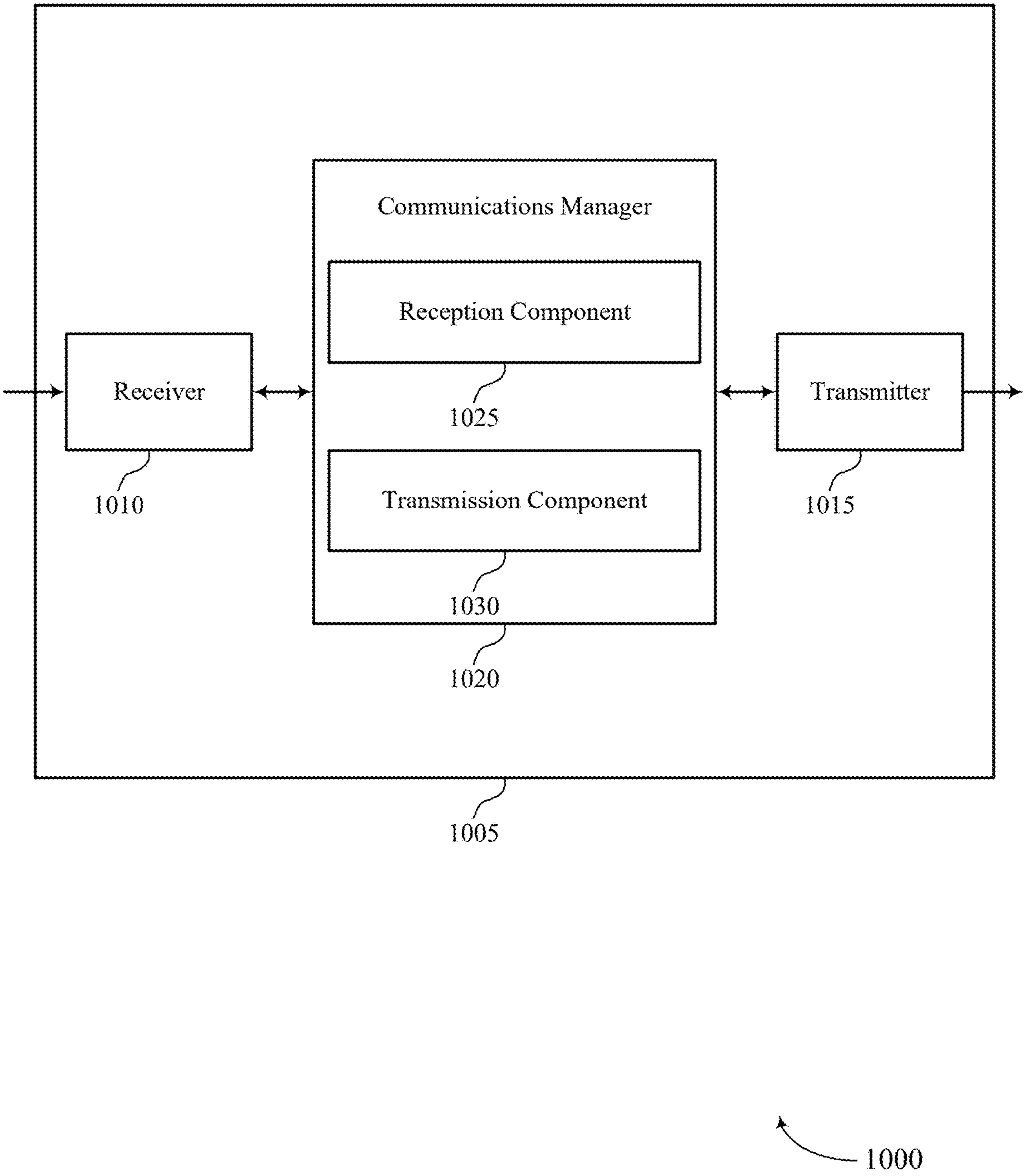

FIG. 10 shows a block diagram 1000 of a device 1005 that supports signaling and selection of communication parameters in a wireless communications system in accordance with one or more aspects of the present disclosure. The device 1005 may be an example of aspects of a device 905 or a network entity 105 as described herein. The device 1005 may include a receiver 1010, a transmitter 1015, and a communications manager 1020. The device 1005, or one of more components of the device 1005 (e.g., the receiver 1010, the transmitter 1015, the communications manager 1020), may include at least one processor, which may be coupled with at least one memory, to support the described techniques. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The device 1005, or various components thereof, may be an example of means for performing various aspects of signaling and selection of communication parameters in a wireless communications system as described herein. For example, the communications manager 1020 may include a reception component 1025 a transmission component 1030, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communications in accordance with examples as disclosed herein. The reception component 1025 is capable of, configured to, or operable to support a means for receiving a first indication of a first quantity of communication resources associated with a first processing time in which a UE is capable of processing a message that is transmitted over a set of transmission layers using the first quantity of communication resources. The reception component 1025 is capable of, configured to, or operable to support a means for receiving a second indication of a second quantity of communication resources associated with a second processing time in which the UE is capable of processing a message that is transmitted over the set of transmission layers using the second quantity of communication resources, where the second quantity of communication resources is greater than the first quantity of communication resources, and the second processing time is greater than the first processing time. The transmission component 1030 is capable of, configured to, or operable to support a means for transmitting control signaling, for a scheduled message and based on the first indication and the second indication, that indicates one of the first quantity of communication resources or the second quantity of communication resources and that schedules the UE in accordance with one of the first processing time or the second processing time.

Figure 11:
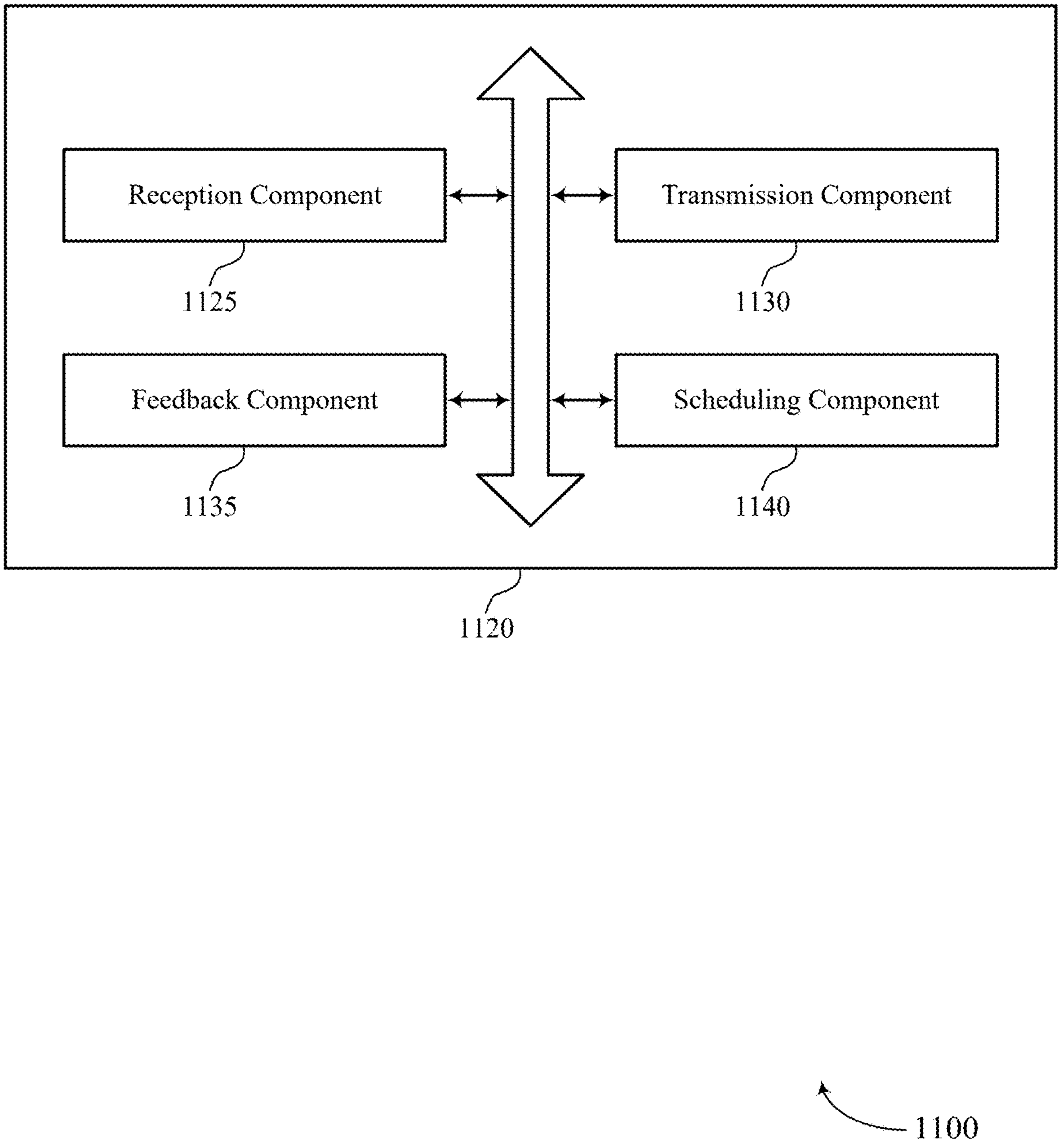
FIG. 11 shows a block diagram of a communications manager that supports signaling and selection of communication parameters in a wireless communications system in accordance with one or more aspects of the present disclosure.

FIG. 11 shows a block diagram 1100 of a communications manager 1120 that supports signaling and selection of communication parameters in a wireless communications system in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of signaling and selection of communication parameters in a wireless communications system as described herein. For example, the communications manager 1120 may include a reception component 1125, a transmission component 1130, a feedback component 1135, a scheduling component 1140, or any combination thereof. Each of these components, or components or subcomponents thereof (e.g., one or more processors, one or more memories), may communicate, directly or indirectly, with one another (e.g., via one or more buses). The communications may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1120 may support wireless communications in accordance with examples as disclosed herein. The reception component 1125 is capable of, configured to, or operable to support a means for receiving a first indication of a first quantity of communication resources associated with a first processing time in which a UE is capable of processing a message that is transmitted over a set of transmission layers using the first quantity of communication resources. In some examples, the reception component 1125 is capable of, configured to, or operable to support a means for receiving a second indication of a second quantity of communication resources associated with a second processing time in which the UE is capable of processing a message that is transmitted over the set of transmission layers using the second quantity of communication resources, where the second quantity of communication resources is greater than the first quantity of communication resources, and the second processing time is greater than the first processing time. The transmission component 1130 is capable of, configured to, or operable to support a means for transmitting control signaling, for a scheduled message and based on the first indication and the second indication, that indicates one of the first quantity of communication resources or the second quantity of communication resources and that schedules the UE in accordance with one of the first processing time or the second processing time.

In some examples, the first processing time is associated with a first latency for providing feedback, and the transmission component 1130 is capable of, configured to, or operable to support a means for transmitting the scheduled message based on the control signaling. In some examples, the first processing time is associated with a first latency for providing feedback, and the feedback component 1135 is capable of, configured to, or operable to support a means for receiving a feedback message for the scheduled message according to a second latency that is longer than the first latency.

In some examples, the control signaling indicates the second latency.

In some examples, the control signaling indicates the second quantity of communication resources and schedules the UE in accordance with the second processing time. In some examples, the control signaling schedules the UE with a gap in communications relative to receipt of the scheduled message. In some examples, a duration of the gap is based on the second processing time.

In some examples, the second processing time is based on the second quantity of communication resources, the set of transmission layers, and a baseline processing time for the UE to process PDSCH messages.

In some examples, the scheduling component 1140 is capable of, configured to, or operable to support a means for transmitting an indication for the UE to process a second scheduled message according to the first processing time.

In some examples, the scheduling component 1140 is capable of, configured to, or operable to support a means for transmitting an indication of a TDD duty cycle associated with the first processing time.

In some examples, the second indication also indicates the second processing time associated with the second quantity of communication resources.

In some examples, the second processing time is indicated as a duration of time, as a TDD duty cycle value or pattern, or as a quantity of slots.

In some examples, the first quantity of communication resources and the second quantity of communication resources both include resource blocks.

In some examples, the first quantity of communication resources and the second quantity of communication resources both include component carriers.

In some examples, the second processing time is associated with a reduced throughput relative to a peak throughput for the UE, a relaxed feedback timeline relative to a baseline feedback timeline for the UE, or both.

Figure 12:
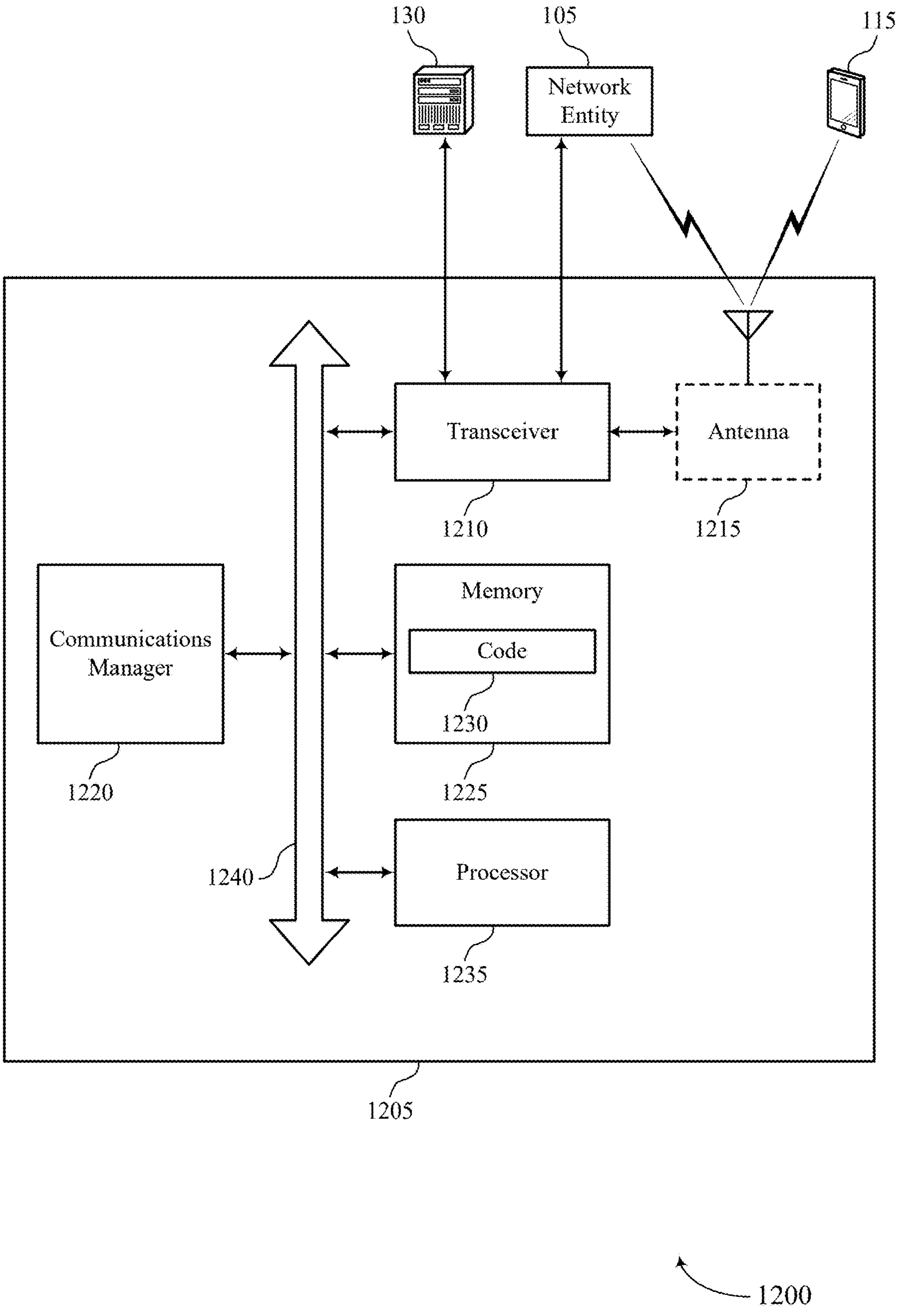
FIG. 12 shows a diagram of a system including a device that supports signaling and selection of communication parameters in accordance with one or more aspects of the present disclosure.

FIG. 12 shows a diagram of a system 1200 including a device 1205 that supports signaling and selection of communication parameters in a wireless communications system in accordance with one or more aspects of the present disclosure. The device 1205 may be an example of or include components of a device 905, a device 1005, or a network entity 105 as described herein. The device 1205 may communicate with other network devices or network equipment such as one or more of the network entities 105, UEs 115, or any combination thereof. The communications may include communications over one or more wired interfaces, over one or more wireless interfaces, or any combination thereof. The device 1205 may include components that support outputting and obtaining communications, such as a communications manager 1220, a transceiver 1210, one or more antennas 1215, at least one memory 1225, code 1230, and at least one processor 1235. These components may be in electronic communication or otherwise coupled (e.g., operatively, communicatively, functionally, electronically, electrically) via one or more buses (e.g., a bus 1240).

The transceiver 1210 may support bi-directional communications via wired links, wireless links, or both as described herein. In some examples, the transceiver 1210 may include a wired transceiver and may communicate bi-directionally with another wired transceiver. Additionally, or alternatively, in some examples, the transceiver 1210 may include a wireless transceiver and may communicate bi-directionally with another wireless transceiver. In some examples, the device 1205 may include one or more antennas 1215, which may be capable of transmitting or receiving wireless transmissions (e.g., concurrently). The transceiver 1210 may also include a modem to modulate signals, to provide the modulated signals for transmission (e.g., by one or more antennas 1215, by a wired transmitter), to receive modulated signals (e.g., from one or more antennas 1215, from a wired receiver), and to demodulate signals. In some implementations, the transceiver 1210 may include one or more interfaces, such as one or more interfaces coupled with the one or more antennas 1215 that are configured to support various receiving or obtaining operations, or one or more interfaces coupled with the one or more antennas 1215 that are configured to support various transmitting or outputting operations, or a combination thereof. In some implementations, the transceiver 1210 may include or be configured for coupling with one or more processors or one or more memory components that are operable to perform or support operations based on received or obtained information or signals, or to generate information or other signals for transmission or other outputting, or any combination thereof. In some implementations, the transceiver 1210, or the transceiver 1210 and the one or more antennas 1215, or the transceiver 1210 and the one or more antennas 1215 and one or more processors or one or more memory components (e.g., the at least one processor 1235, the at least one memory 1225, or both), may be included in a chip or chip assembly that is installed in the device 1205. In some examples, the transceiver 1210 may be operable to support communications via one or more communications links (e.g., communication link(s) 125, backhaul communication link(s) 120, a midhaul communication link 162, a fronthaul communication link 168).

The at least one memory 1225 may include RAM, ROM, or any combination thereof. The at least one memory 1225 may store computer-readable, computer-executable, or processor-executable code, such as the code 1230. The code 1230 may include instructions that, when executed by one or more of the at least one processor 1235, cause the device 1205 to perform various functions described herein. The code 1230 may be stored in a non-transitory computer-readable medium such as system memory or another type of memory. In some cases, the code 1230 may not be directly executable by a processor of the at least one processor 1235 but may cause a computer (e.g., when compiled and executed) to perform functions described herein. In some cases, the at least one memory 1225 may include, among other things, a BIOS which may control basic hardware or software operation such as the interaction with peripheral components or devices. In some examples, the at least one processor 1235 may include multiple processors and the at least one memory 1225 may include multiple memories. One or more of the multiple processors may be coupled with one or more of the multiple memories which may, individually or collectively, be configured to perform various functions herein (for example, as part of a processing system).

The at least one processor 1235 may include one or more intelligent hardware devices (e.g., one or more general-purpose processors, one or more DSPs, one or more CPUs, one or more graphics processing units (GPUs), one or more neural processing units (NPUs) (also referred to as neural network processors or deep learning processors (DLPs)), one or more microcontrollers, one or more ASICs, one or more FPGAs, one or more programmable logic devices, discrete gate or transistor logic, one or more discrete hardware components, or any combination thereof). In some cases, the at least one processor 1235 may be configured to operate a memory array using a memory controller. In some other cases, a memory controller may be integrated into one or more of the at least one processor 1235. The at least one processor 1235 may be configured to execute computer-readable instructions stored in a memory (e.g., one or more of the at least one memory 1225) to cause the device 1205 to perform various functions (e.g., functions or tasks supporting signaling and selection of communication parameters in a wireless communications system). For example, the device 1205 or a component of the device 1205 may include at least one processor 1235 and at least one memory 1225 coupled with one or more of the at least one processor 1235, the at least one processor 1235 and the at least one memory 1225 configured to perform various functions described herein. The at least one processor 1235 may be an example of a cloud-computing platform (e.g., one or more physical nodes and supporting software such as operating systems, virtual machines, or container instances) that may host the functions (e.g., by executing code 1230) to perform the functions of the device 1205. The at least one processor 1235 may be any one or more suitable processors capable of executing scripts or instructions of one or more software programs stored in the device 1205 (such as within one or more of the at least one memory 1225).

In some examples, the at least one processor 1235 may include multiple processors and the at least one memory 1225 may include multiple memories. One or more of the multiple processors may be coupled with one or more of the multiple memories, which may, individually or collectively, be configured to perform various functions herein. In some examples, the at least one processor 1235 may be a component of a processing system, which may refer to a system (such as a series) of machines, circuitry (including, for example, one or both of processor circuitry (which may include the at least one processor 1235) and memory circuitry (which may include the at least one memory 1225)), or components, that receives or obtains inputs and processes the inputs to produce, generate, or obtain a set of outputs. The processing system may be configured to perform one or more of the functions described herein. For example, the at least one processor 1235 or a processing system including the at least one processor 1235 may be configured to, configurable to, or operable to cause the device 1205 to perform one or more of the functions described herein. Further, as described herein, being "configured to," being "configurable to," and being "operable to" may be used interchangeably and may be associated with a capability, when executing code stored in the at least one memory 1225 or otherwise, to perform one or more of the functions described herein.

In some examples, a bus 1240 may support communications of (e.g., within) a protocol layer of a protocol stack. In some examples, a bus 1240 may support communications associated with a logical channel of a protocol stack (e.g., between protocol layers of a protocol stack), which may include communications performed within a component of the device 1205, or between different components of the device 1205 that may be co-located or located in different locations (e.g., where the device 1205 may refer to a system in which one or more of the communications manager 1220, the transceiver 1210, the at least one memory 1225, the code 1230, and the at least one processor 1235 may be located in one of the different components or divided between different components).

In some examples, the communications manager 1220 may manage aspects of communications with a core network 130 (e.g., via one or more wired or wireless backhaul links). For example, the communications manager 1220 may manage the transfer of data communications for client devices, such as one or more UEs 115. In some examples, the communications manager 1220 may manage communications with one or more other network entities 105, and may include a controller or scheduler for controlling communications with UEs 115 (e.g., in cooperation with the one or more other network devices). In some examples, the communications manager 1220 may support an X2 interface within an LTE/LTE-A wireless communications network technology to provide communication between network entities 105.

The communications manager 1220 may support wireless communications in accordance with examples as disclosed herein. For example, the communications manager 1220 is capable of, configured to, or operable to support a means for receiving a first indication of a first quantity of communication resources associated with a first processing time in which a UE is capable of processing a message that is transmitted over a set of transmission layers using the first quantity of communication resources. The communications manager 1220 is capable of, configured to, or operable to support a means for receiving a second indication of a second quantity of communication resources associated with a second processing time in which the UE is capable of processing a message that is transmitted over the set of transmission layers using the second quantity of communication resources, where the second quantity of communication resources is greater than the first quantity of communication resources, and the second processing time is greater than the first processing time. The communications manager 1220 is capable of, configured to, or operable to support a means for transmitting control signaling, for a scheduled message and based on the first indication and the second indication, that indicates one of the first quantity of communication resources or the second quantity of communication resources and that schedules the UE in accordance with one of the first processing time or the second processing time.

By including or configuring the communications manager 1220 in accordance with examples as described herein, the device 1205 may support techniques for more efficient utilization of communication resources.

In some examples, the communications manager 1220 may be configured to perform various operations (e.g., receiving, obtaining, monitoring, outputting, transmitting) using or otherwise in cooperation with the transceiver 1210, the one or more antennas 1215 (e.g., where applicable), or any combination thereof. Although the communications manager 1220 is illustrated as a separate component, in some examples, one or more functions described with reference to the communications manager 1220 may be supported by or performed by the transceiver 1210, one or more of the at least one processor 1235, one or more of the at least one memory 1225, the code 1230, or any combination thereof (for example, by a processing system including at least a portion of the at least one processor 1235, the at least one memory 1225, the code 1230, or any combination thereof). For example, the code 1230 may include instructions executable by one or more of the at least one processor 1235 to cause the device 1205 to perform various aspects of signaling and selection of communication parameters in a wireless communications system as described herein, or the at least one processor 1235 and the at least one memory 1225 may be otherwise configured to, individually or collectively, perform or support such operations.

Figure 13:
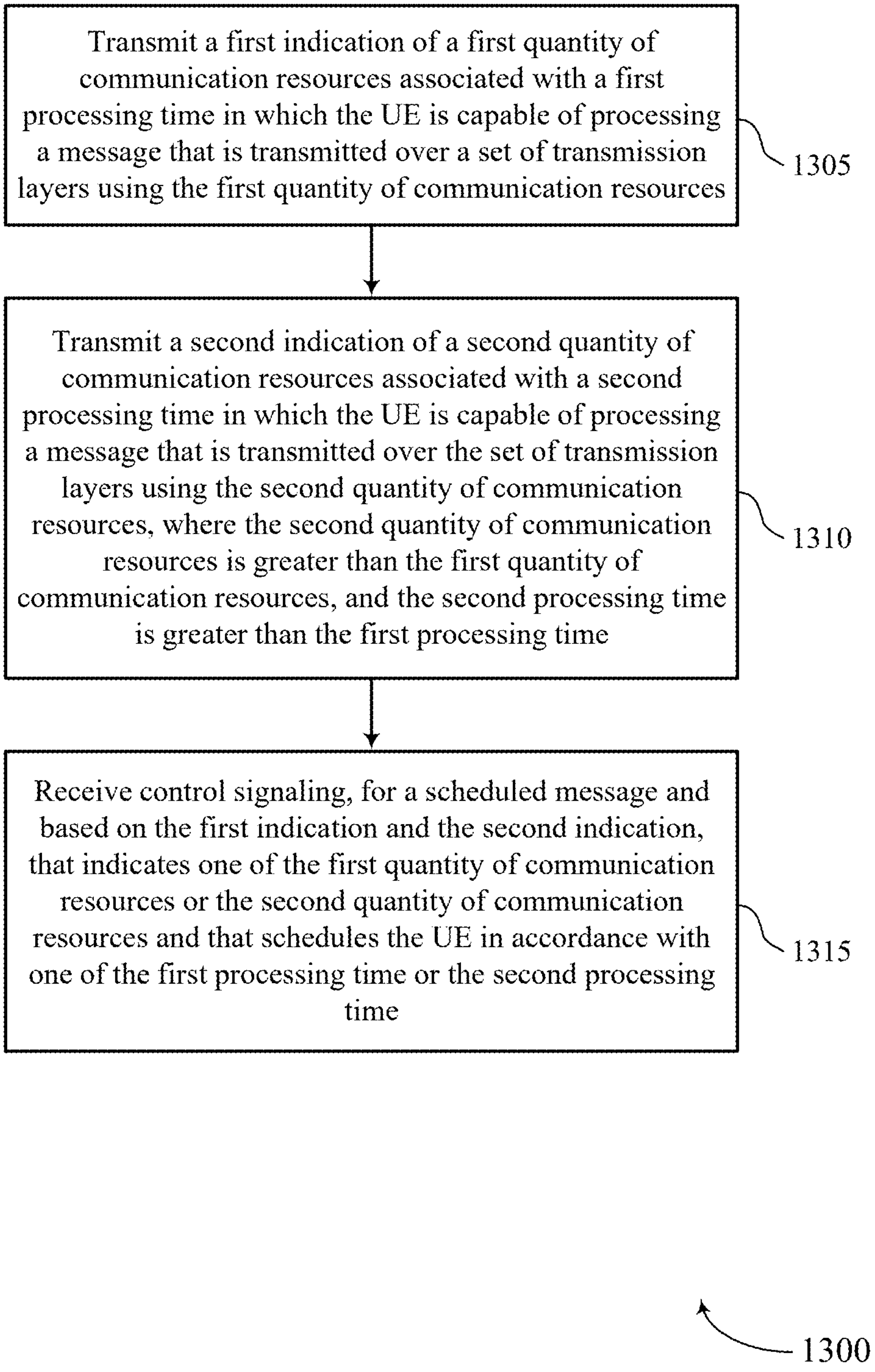
FIGS. 13 and 14 show flowcharts illustrating methods that support signaling and selection of communication parameters in a wireless communications system in accordance with one or more aspects of the present disclosure.

FIG. 13 shows a flowchart illustrating a method 1300 that supports signaling and selection of communication parameters in a wireless communications system in accordance with one or more aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1305, the method may include transmitting a first indication of a first quantity of communication resources associated with a first processing time in which the UE is capable of processing a message that is transmitted over a set of transmission layers using the first quantity of communication resources. The operations of 1305 may be performed in accordance with examples as disclosed herein. In some examples, aspects of the operations of 1305 may be performed by a transmission component 725 as described with reference to FIG. 7.

At 1310, the method may include transmitting a second indication of a second quantity of communication resources associated with a second processing time in which the UE is capable of processing a message that is transmitted over the set of transmission layers using the second quantity of communication resources, where the second quantity of communication resources is greater than the first quantity of communication resources, and the second processing time is greater than the first processing time. The operations of 1310 may be performed in accordance with examples as disclosed herein. In some examples, aspects of the operations of 1310 may be performed by a transmission component 725 as described with reference to FIG. 7.

At 1315, the method may include receiving control signaling, for a scheduled message and based on the first indication and the second indication, that indicates one of the first quantity of communication resources or the second quantity of communication resources and that schedules the UE in accordance with one of the first processing time or the second processing time. The operations of 1315 may be performed in accordance with examples as disclosed herein. In some examples, aspects of the operations of 1315 may be performed by a reception component 730 as described with reference to FIG. 7.

Figure 14:
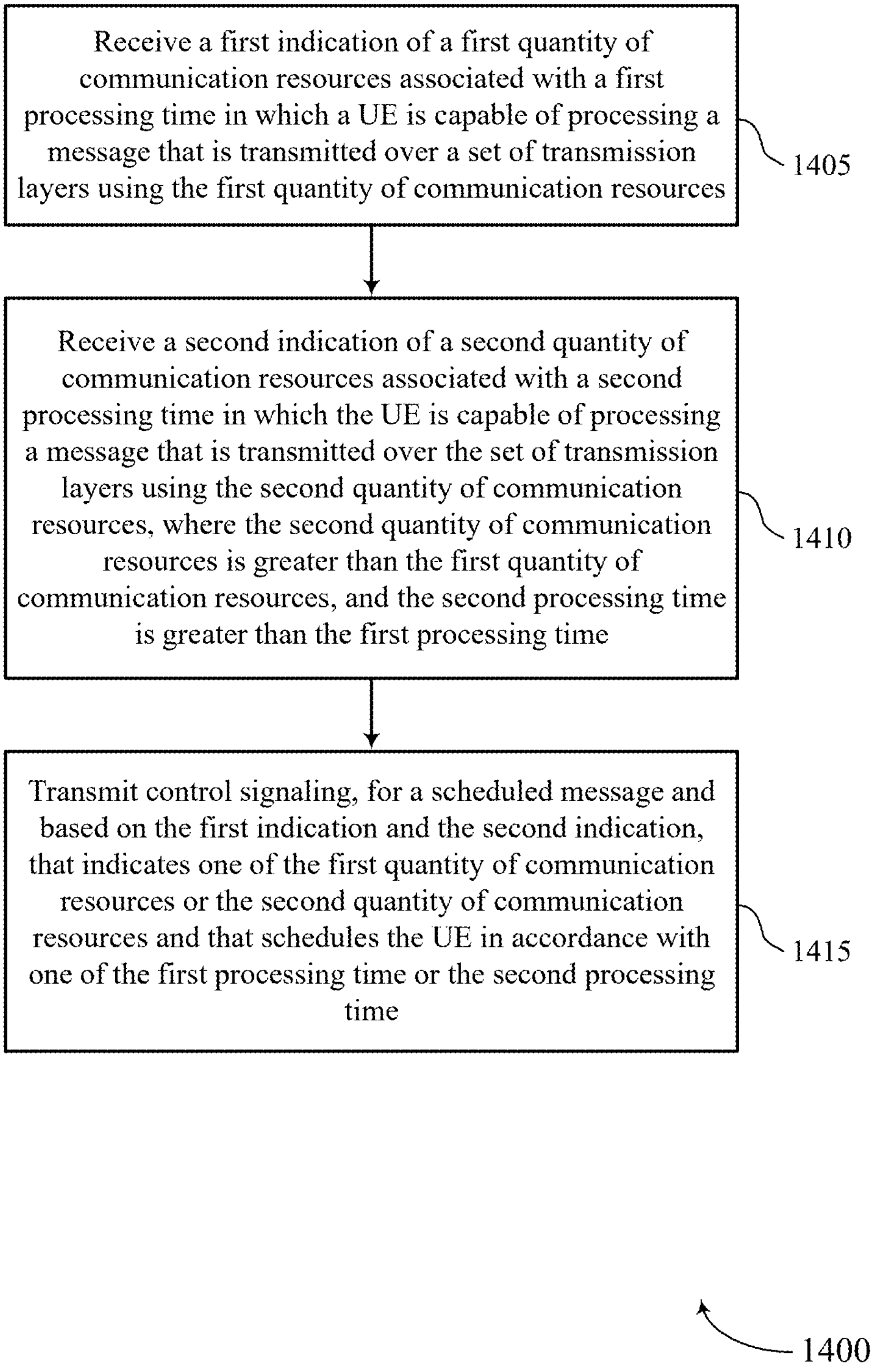

FIG. 14 shows a flowchart illustrating a method 1400 that supports signaling and selection of communication parameters in a wireless communications system in accordance with one or more aspects of the present disclosure. The operations of the method 1400 may be implemented by a network entity or its components as described herein. For example, the operations of the method 1400 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1405, the method may include receiving a first indication of a first quantity of communication resources associated with a first processing time in which a UE is capable of processing a message that is transmitted over a set of transmission layers using the first quantity of communication resources. The operations of 1405 may be performed in accordance with examples as disclosed herein. In some examples, aspects of the operations of 1405 may be performed by a reception component 1125 as described with reference to FIG. 11.

At 1410, the method may include receiving a second indication of a second quantity of communication resources associated with a second processing time in which the UE is capable of processing a message that is transmitted over the set of transmission layers using the second quantity of communication resources, where the second quantity of communication resources is greater than the first quantity of communication resources, and the second processing time is greater than the first processing time. The operations of 1410 may be performed in accordance with examples as disclosed herein. In some examples, aspects of the operations of 1410 may be performed by a reception component 1125 as described with reference to FIG. 11.

At 1415, the method may include transmitting control signaling, for a scheduled message and based on the first indication and the second indication, that indicates one of the first quantity of communication resources or the second quantity of communication resources and that schedules the UE in accordance with one of the first processing time or the second processing time. The operations of 1415 may be performed in accordance with examples as disclosed herein. In some examples, aspects of the operations of 1415 may be performed by a transmission component 1130 as described with reference to FIG. 11.

The following provides an overview of aspects of the present disclosure:

Aspect 1: A method for wireless communications at a UE, comprising: transmitting a first indication of a first quantity of communication resources associated with a first processing time in which the UE is capable of processing a message that is transmitted over a set of transmission layers using the first quantity of communication resources; transmitting a second indication of a second quantity of communication resources associated with a second processing time in which the UE is capable of processing a message that is transmitted over the set of transmission layers using the second quantity of communication resources, wherein the second quantity of communication resources is greater than the first quantity of communication resources, and the second processing time is greater than the first processing time; and receiving control signaling, for a scheduled message and based at least in part on the first indication and the second indication, that indicates one of the first quantity of communication resources or the second quantity of communication resources and that schedules the UE in accordance with one of the first processing time or the second processing time.

Aspect 2: The method of aspect 1, wherein the first processing time is associated with a first latency for providing feedback, and wherein the control signaling indicates the second quantity of communication resources and schedules the UE in accordance with the second processing time, the method further comprising: receiving the scheduled message based at least in part on the control signaling; and transmitting a feedback message for the scheduled message according to a second latency that is longer than the first latency.

Aspect 3: The method of aspect 2, wherein the control signaling indicates the second latency.

Aspect 4: The method of any of aspects 1 through 3, wherein the control signaling indicates the second quantity of communication resources and schedules the UE in accordance with the second processing time, the control signaling schedules the UE with a gap in communications relative to receipt of the scheduled message, and a duration of the gap is based at least in part on the second processing time.

Aspect 5: The method of any of aspects 1 through 4, wherein the second processing time is based at least in part on the second quantity of communication resources, the set of transmission layers, and a baseline processing time for the UE to process PDSCH messages.

Aspect 6: The method of any of aspects 1 through 5, further comprising: processing a second scheduled message according to the first processing time based at least in part on expiration of a timer associated with the second processing time.

Aspect 7: The method of any of aspects 1 through 6, further comprising: processing a second scheduled message according to the first processing time based at least in part on receiving an indication to process the second scheduled message according to the first processing time.

Aspect 8: The method of any of aspects 1 through 7, further comprising: processing a second scheduled message according to the first processing time based at least in part on receiving an indication of a TDD duty cycle associated with the first processing time.

Aspect 9: The method of any of aspects 1 through 8, wherein the second indication also indicates the second processing time associated with the second quantity of communication resources.

Aspect 10: The method of aspect 9, wherein the second processing time is indicated as a duration of time, as a TDD duty cycle value or pattern, or as a quantity of slots.

Aspect 11: The method of any of aspects 1 through 10, wherein the first quantity of communication resources and the second quantity of communication resources both comprise resource blocks.

Aspect 12: The method of any of aspects 1 through 11, wherein the first quantity of communication resources and the second quantity of communication resources both comprise component carriers.

Aspect 13: The method of any of aspects 1 through 12, wherein the second processing time is associated with a reduced throughput relative to a peak throughput for the UE, a relaxed feedback timeline relative to a baseline feedback timeline for the UE, or both.

Aspect 14: A method for wireless communications at a network entity, comprising: receiving a first indication of a first quantity of communication resources associated with a first processing time in which a UE is capable of processing a message that is transmitted over a set of transmission layers using the first quantity of communication resources; receiving a second indication of a second quantity of communication resources associated with a second processing time in which the UE is capable of processing a message that is transmitted over the set of transmission layers using the second quantity of communication resources, wherein the second quantity of communication resources is greater than the first quantity of communication resources, and the second processing time is greater than the first processing time; and transmitting control signaling, for a scheduled message and based at least in part on the first indication and the second indication, that indicates one of the first quantity of communication resources or the second quantity of communication resources and that schedules the UE in accordance with one of the first processing time or the second processing time.

Aspect 15: The method of aspect 14, wherein the first processing time is associated with a first latency for providing feedback, and wherein the control signaling indicates the second quantity of communication resources and schedules the UE in accordance with the second processing time, the method further comprising: transmitting the scheduled message based at least in part on the control signaling; and receiving a feedback message for the scheduled message according to a second latency that is longer than the first latency.

Aspect 16: The method of aspect 15, wherein the control signaling indicates the second latency.

Aspect 17: The method of any of aspects 14 through 16, wherein the control signaling indicates the second quantity of communication resources and schedules the UE in accordance with the second processing time, the control signaling schedules the UE with a gap in communications relative to receipt of the scheduled message, and a duration of the gap is based at least in part on the second processing time.

Aspect 18: The method of any of aspects 14 through 17, wherein the second processing time is based at least in part on the second quantity of communication resources, the set of transmission layers, and a baseline processing time for the UE to process PDSCH messages.

Aspect 19: The method of any of aspects 14 through 18, further comprising: transmitting an indication for the UE to process a second scheduled message according to the first processing time.

Aspect 20: The method of any of aspects 14 through 19, further comprising: transmitting an indication of a TDD duty cycle associated with the first processing time.

Aspect 21: The method of any of aspects 14 through 20, wherein the second indication also indicates the second processing time associated with the second quantity of communication resources.

Aspect 22: The method of aspect 21, wherein the second processing time is indicated as a duration of time, as a TDD duty cycle value or pattern, or as a quantity of slots.

Aspect 23: The method of any of aspects 14 through 22, wherein the first quantity of communication resources and the second quantity of communication resources both comprise resource blocks.

Aspect 24: The method of any of aspects 14 through 23, wherein the first quantity of communication resources and the second quantity of communication resources both comprise component carriers.

Aspect 25: The method of any of aspects 14 through 24, wherein the second processing time is associated with a reduced throughput relative to a peak throughput for the UE, a relaxed feedback timeline relative to a baseline feedback timeline for the UE, or both.

Aspect 26: A UE for wireless communications, comprising one or more memories storing processor-executable code, and one or more processors coupled with the one or more memories and individually or collectively operable to execute the code to cause the UE to perform a method of any of aspects 1 through 13.

Aspect 27: A UE for wireless communications, comprising at least one means for performing a method of any of aspects 1 through 13.

Aspect 28: A non-transitory computer-readable medium storing code for wireless communications, the code comprising instructions executable by one or more processors to perform a method of any of aspects 1 through 13.

Aspect 29: A network entity for wireless communications, comprising one or more memories storing processor-executable code, and one or more processors coupled with the one or more memories and individually or collectively operable to execute the code to cause the network entity to perform a method of any of aspects 14 through 25.

Aspect 30: A network entity for wireless communications, comprising at least one means for performing a method of any of aspects 14 through 25.

Aspect 31: A non-transitory computer-readable medium storing code for wireless communications, the code comprising instructions executable by one or more processors to perform a method of any of aspects 14 through 25.

It should be noted that the methods described herein describe possible implementations. The operations and the steps may be rearranged or otherwise modified and other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, a graphics processing unit (GPU), a neural processing unit (NPU), an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk, and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," and "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database, or another data structure), ascertaining, and the like. Also, "determining" can include receiving (e.g., receiving information), accessing (e.g., accessing data stored in memory), and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label or other subsequent reference label.

The description set forth herein, in connection with the appended drawings, describes example configurations and does not represent all the examples that may be implemented or that are within the scope of the claims. The term "example" used herein means "serving as an example, instance, or illustration" and not "preferred" or "advantageous over other examples." The detailed description includes specific details for the purpose of providing an understanding of the described techniques. These techniques, however, may be practiced without these specific details. In some figures, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE), comprising:

one or more memories storing processor-executable code; and one or more processors coupled with the one or more memories and individually or collectively operable to execute the code to cause the UE to:

transmit a first indication of a first quantity of communication resources associated with a first processing time in which the UE is capable of processing a message that is transmitted over a set of transmission layers using the first quantity of communication resources;

transmit a second indication of a second quantity of communication resources associated with a second processing time in which the UE is capable of processing a message that is transmitted over the set of transmission layers using the second quantity of communication resources, wherein the second quantity of communication resources is greater than the first quantity of communication resources, and the second processing time is greater than the first processing time; and receive control signaling, for a scheduled message and based at least in part on the first indication and the second indication, that indicates one of the first quantity of communication resources or the second quantity of communication resources and that schedules the UE in accordance with one of the first processing time or the second processing time.

2. The UE of claim 1, wherein the second processing time is associated with discontinuous scheduling of the UE in which the UE is scheduled with temporal gaps between communications.

3. The UE of claim 1, wherein the first processing time is associated with a first latency for providing feedback, and the one or more processors are individually or collectively further operable to execute the code to cause the UE to:

receive the scheduled message based at least in part on the control signaling; and transmit a feedback message for the scheduled message according to a second latency that is longer than the first latency.

4. The UE of claim 3, wherein the control signaling indicates the second latency.

5. The UE of claim 1, wherein:

the control signaling indicates the second quantity of communication resources and schedules the UE in accordance with the second processing time, the control signaling schedules the UE with a gap in communications relative to receipt of the scheduled message, and a duration of the gap is based at least in part on the second processing time.

6. The UE of claim 1, wherein the second processing time is based at least in part on the second quantity of communication resources, the set of transmission layers, and a baseline processing time for the UE to process physical downlink shared channel (PDSCH) messages.

7. The UE of claim 1, wherein the one or more processors are individually or collectively further operable to execute the code to cause the UE to:

process a second scheduled message according to the first processing time based at least in part on expiration of a timer associated with the second processing time.

8. The UE of claim 1, wherein the one or more processors are individually or collectively further operable to execute the code to cause the UE to:

process a second scheduled message according to the first processing time based at least in part on receiving an indication to process the second scheduled message according to the first processing time.

9. The UE of claim 1, wherein the one or more processors are individually or collectively further operable to execute the code to cause the UE to:

process a second scheduled message according to the first processing time based at least in part on receiving an indication of a time division duplexing (TDD) duty cycle associated with the first processing time.

10. The UE of claim 1, wherein the second indication also indicates the second processing time associated with the second quantity of communication resources.

11. The UE of claim 10, wherein the second processing time is indicated as a duration of time, as a time division duplexing (TDD) duty cycle value or pattern, or as a quantity of slots.

12. The UE of claim 1, wherein:

the first quantity of communication resources and the second quantity of communication resources both comprise resource blocks.

13. The UE of claim 1, wherein:

the first quantity of communication resources and the second quantity of communication resources both comprise component carriers.

14. The UE of claim 1, wherein the second processing time is associated with a reduced throughput relative to a peak throughput for the UE, a relaxed feedback timeline relative to a baseline feedback timeline for the UE, or both.

15. A method for wireless communications at a user equipment (UE), comprising:

transmitting a first indication of a first quantity of communication resources associated with a first processing time in which the UE is capable of processing a message that is transmitted over a set of transmission layers using the first quantity of communication resources;

transmitting a second indication of a second quantity of communication resources associated with a second processing time in which the UE is capable of processing a message that is transmitted over the set of transmission layers using the second quantity of communication resources, wherein the second quantity of communication resources is greater than the first quantity of communication resources, and the second processing time is greater than the first processing time; and receiving control signaling, for a scheduled message and based at least in part on the first indication and the second indication, that indicates one of the first quantity of communication resources or the second quantity of communication resources and that schedules the UE in accordance with one of the first processing time or the second processing time.

16. The method of claim 15, wherein the first processing time is associated with a first latency for providing feedback, and wherein the control signaling indicates the second quantity of communication resources and schedules the UE in accordance with the second processing time, the method further comprising:

receiving the scheduled message based at least in part on the control signaling; and transmitting a feedback message for the scheduled message according to a second latency that is longer than the first latency.

17. The method of claim 15, wherein the control signaling indicates the second quantity of communication resources and schedules the UE in accordance with the second processing time, wherein the control signaling schedules the UE with a gap in communications relative to receipt of the scheduled message, and wherein a duration of the gap is based at least in part on the second processing time.

18. The method of claim 15, further comprising:

processing a second scheduled message according to the first processing time based at least in part on expiration of a timer associated with the second processing time or based at least in part on receiving an indication to process the second scheduled message according to the first processing time.

19. The method of claim 15, further comprising:

processing a second scheduled message according to the first processing time based at least in part on receiving an indication of a time division duplexing (TDD) duty cycle associated with the first processing time.

20. A user equipment (UE), comprising:

a processing system that includes processor circuitry and memory circuitry that stores code, the processing system configured to cause the UE to:

transmit a first indication of a first quantity of communication resources associated with a first processing time in which the UE is capable of processing a message that is transmitted over a set of transmission layers using the first quantity of communication resources;

transmit a second indication of a second quantity of communication resources associated with a second processing time in which the UE is capable of processing a message that is transmitted over the set of transmission layers using the second quantity of communication resources, wherein the second quantity of communication resources is greater than the first quantity of communication resources, and the second processing time is greater than the first processing time; and receive control signaling, for a scheduled message and based at least in part on the first indication and the second indication, that indicates one of the first quantity of communication resources or the second quantity of communication resources and that schedules the UE in accordance with one of the first processing time or the second processing time.

* * * * *